United States Patent [19]
Marx et al.

[11] Patent Number: 5,880,838
[45] Date of Patent: Mar. 9, 1999

[54] SYSTEM AND METHOD FOR OPTICALLY MEASURING A STRUCTURE

[75] Inventors: David Marx; Demetri Psaltis, both of Pasadena, Calif.

[73] Assignee: California Institute of California, Pasadena, Calif.

[21] Appl. No.: 659,168

[22] Filed: Jun. 5, 1996

[51] Int. Cl.⁶ .................................................. G01B 9/02
[52] U.S. Cl. ........................ 356/351; 356/354; 356/359; 250/237 G
[58] Field of Search .................................. 356/351, 354, 356/355, 237, 237 G, 238–240, 359, 360; 250/559.19, 559.22, 559.4, 559.42, 599.44

[56] References Cited

U.S. PATENT DOCUMENTS

| | | | |
|---|---|---|---|
| 4,236,823 | 12/1980 | Roach et al. | 356/351 |
| 5,432,607 | 7/1995 | Taubenblatt | 356/237 |
| 5,486,919 | 1/1996 | Tsuji et al. | 356/351 |

OTHER PUBLICATIONS

Giovannini, et al., "Angle–resolved polarimetric phase measurement for the characterization of grating", Optic Letters, 21(20):1619, Oct. 15, 1996.
Bouwhuis, et al., "*Principles of Optical Disc Systems,*" Philips Research Laboratories, Eindhoven, Adam Hilger Ltd, Bristol and Boston, pp. 88–124, 1985.
Dil and Jacobs, "*Apparent size of reflecting polygonal obstacles of the orde of one wavelength,*" J. Opt. Soc. Am., 69(7):950, Jul. 1979.
Roger F. Harrington, "*Time–Harmonic Electromagnetic Fields*", Introduction to Waves, McGraw–Hill Book Co. pp. 66–91, 1961.
Bach, et al., "*Modern Topics in Electromagnetics and Antennas,*" PPL Conference Publication 13, Based on Lectures delivered at the 1976 Summer Inst. at the Technical University, Eindhoven, pp. 6.1–6.59, 1977.
Prins, et al., "*Scatterometric sensor for PEB process control,*" 1996 SPIE Microlithography Conference in Santa Clara, CA, Proceedings SPIE 2725, pp. 1–10.
Raymond, et al., "*Multi–parameter CD measurements using scatterometry,*" 1996 SPIE Microlithography Conference in Santa Clara, CA, Proceedings SPIE 2725, pp. 1–12.
Sirat and Psaltis, "*Conoscopic holography*", Optics Letters 10(1):4, Jan. 1985.
Wirgin, A., "*A New Theoretical Approach To Scattering From a Periodic Interface,*" Optics Communications, 27(2):189, Nov. 1978.

Primary Examiner—Robert Kim
Attorney, Agent, or Firm—Fish & Richardson P.C.

[57] ABSTRACT

A system and method for measuring the dimensions of a small (e.g., microelectronic) structure. The present invention is an optical system and method that uses a polarized light beam, reflected off or transmitted through, a structure, to measure the structural parameters, such as the lateral dimensions, vertical dimensions, height, or the type of structural material. The system employs a light source to generate a light beam that is polarized and focused onto the structure to be measured. The structure is illuminated with TE and TM polarized light. The structure is dimensioned such that the TM and TE fields are affected differently by the diffraction off the structure. As a result, either the TE or TM field can be used as a reference to analyze the phase and amplitude changes in the other field. Differences between the diffracted TE and TM far fields allow a comparison of the relationship between the amplitude and phase of those fields to determine the structural parameters of a structure.

10 Claims, 25 Drawing Sheets

Figure 4: *The PQM system for measuring the parameters of a trench. Only one leg of the PQM detector is shown. The added lenses before the detectors allows imaging as in a traditional microscope.

* PIT PHASE DEPTH FOR DIFFERENT PIT WIDTHS WITH THE PIT DEPTH EQUAL TO A QUARTER WAVE. IN THE REGION WHERE THE PIT WIDTH IS BETWEEN $\lambda/2$ ($\lambda$ IS ADJUSTED FOR THE INDEX OF REFRACTION OF THE INCIDENT MEDIUM) AND $\lambda$, THE PHASE DEPTH FOR TE ILLUMINATION VARIES ALMOST A QUARTER WAVE, BUT IT REMAINS FAIRLY CONSTANT FOR TM ILLUMINATION.

In-phase and quadrature detection of the TM far field using the TE field as a reference.

Figure 4: *The PQM system for measuring the parameters of a trench. Only one leg of the PQM detector is shown. The added lenses before the detectors allows imaging as in a traditional microscope.

FIGURE 3: * THE TE/TM QUADRATURE SIGNAL FOR A 0.25 μm WIDE GROOVE IN SILICON FOR INCREASING GROOVE DEPTH. THE DEPTH IS INCREMENTED IN STEPS OF λ/4 FROM 0 TO 4λ. THE WAVELENGTH λ=0.248nm, THE NUMERICAL APERTURE FOR THE INCIDENT LIGTH IS 0.6, AND THE NUMERICAL APERTURE FOR COLLECTING THE REFLECTED LIGHT IS 0.1.

GENERAL DIFFRACTION GEOMETRY

DIFFRACTING SURFACE WITH THE INCIDENT FIELD
GENERATED BY DISTANT SOURCES

SYSTEM AND METHOD FOR OPTICALLY MEASURING A STRUCTURE

STATEMENT AS TO FEDERALLY SPONSORED RESEARCH

The invention described herein was made in the performance of work under a grant from the Department of the Army, and is subject to the provisions of Public Law 96-517 (35 U.S.C. §202), in which the Contractor has elected to retain title. The U.S. Government has certain rights in this invention pursuant to Grant No. DAAH04-93-G-0192 awarded by the Army.

BACKGROUND OF THE INVENTION

1. Field of the Invention

The present invention is a system and method for measuring the dimensions of a small structure, such as a microelectronic device. More particularly, the present invention is an optical measuring device that uses a polarized light beam, reflected off a very small structure, to measure the dimensions of the structure.

2. Background and Summary

Current microelectronics fabrication processes can produce structures as small as 0.25 microns. Indeed, structures even smaller than 0.25 microns will soon be fabricated commercially. (For the remainder of this description, the term "structure" will be used to mean any type of feature to be measured by the present invention, including grooves, pits, lines, bumps, and other three dimensional objects.)

The quality control inspection required at each step of the fabrication process becomes a problem with structures having such small dimensions. The small size allows many structures to be fabricated on a wafer, meaning that more layers of interconnections must also be fabricated on the wafer. Thus, the method for inspecting such devices must be fast and efficient in order to inspect every wafer on a fabrication line. In addition, the method must not damage the wafer.

Several methods currently exist for measuring such small structures, but these methods suffer from disadvantages that prevent their use or at least make them impractical for inspecting microelectronic wafers on-line. One such method employs a scanning electron microscope to measure the structures. This method is expensive and slow, however, because each wafer must be placed in a vacuum chamber, which must then be evacuated, before the measurement can be performed. Moreover, most electron microscopy techniques require that the wafer be cut so that the wafer's profile can be measured. These techniques, therefore, cannot be used to inspect wafers on-line.

Conventional optical microscope methods also cannot be used for such small structures. Such methods can barely resolve structures of this scale and thus do not provide accurate dimensional data.

Another method for measuring such small structures, which employs an atomic force microscope, is even slower than electron microscopy. This method, moreover, is impractical for structures with high aspect ratios, i.e., structures in which the height or depth is much larger than the smallest dimension. An example of a high aspect ratio structure is a contact hole etched through oxide layers for contacting a circuit device with metallization. Another example of a high aspect ratio structure is a capacitor trench etched into a silicon substrate for DRAM cell fabrication.

Optical diffraction methods have also been used to measure small microelectronic structures. These optical methods measure the scatter of plane waves and assume that the structures form gratings (i.e., periodic structures). This assumption, however, generally does not hold. Further, these methods cannot be used to measure individual or aperiodic structures.

Accordingly, the inventor recognized a need for an optical system and method for measuring small individual or aperiodic structures that is fast, efficient, and inexpensive and that overcomes the disadvantages and drawbacks of the prior art. The present invention provides such a system and method.

An object of the present invention is to provide an optical system and method for measuring a lateral dimension or a vertical dimension of a structure by focusing a polarized beam of light onto the structure and measuring the phase and amplitude of the reflected polarization components, where the lateral dimension is smaller than the wavelength of the light beam.

Another object of the present invention is to provide methods for determining the amplitude and phase of the reflected polarization components of the light beam.

Another object of the present invention is to provide methods for testing the stability and accuracy of the method of calculating the amplitude and phase of the polarization components.

Yet another object of the present invention is to provide an apparatus for detecting the reflected polarized light beam.

The system of the present invention employs a light source to generate a beam of light that is polarized and focused onto a structure to be measured. Preferably, the light beam is approximately monochromatic. The structure is illuminated with both a transverse electric (TE) polarized field and a transverse magnetic (TM) polarized field. The structure has a plurality of lateral dimensions (e.g., length and width) and at least one vertical dimension (e.g., depth or height). These lateral and vertical dimensions will be generally referred to throughout this description as "structural parameters." The term "structural parameter" should also be understood to include the type of material making up the structure, e.g., gold or silver. One of these structural parameters is preferably substantially larger than the wavelength of the incident light beam. Another one of the structural parameters is small enough so that, when the incident light is diffracted off the structure, the amplitude and phase of the diffracted TM and TE are affected differently by the structure. Preferably, the light beam has polarization components substantially parallel (TE) and perpendicular (TM) to the larger structural parameter.

The focused light beam is diffracted off the structure and is detected by a detector. The TM and TE fields are affected differently by the diffraction off the structure. The TE field can be used as a reference to analyze the phase and amplitude changes in the TM field. The relationship between phases and amplitudes of the TE and TM fields is dependent on the structural parameters of the structure. Thus, the parameters of the structure can be determined by examining the amplitude and phase relationship between the reflected TE and TM fields.

The system uses beam splitters, wave plates, and detector elements to measure the reflected light beam. Preferably, the light beam propagates through a polarizer and a beam splitter and is focused onto the structure. The light beam then preferably is reflected off the structure and back through the beam splitter. Alternatively, the light beam can be transmitted through the structure. The in-phase and quadrature components of the TM field, using the TE field as a reference, are then measured. The system may have an in-phase and quadrature leg, so that both components can be measured in parallel. Alternatively, the system may have only one leg for measuring the in-phase and quadrature components, with a time delay being employed to measure the components in series. Preferably, the system includes four separate detector elements, two each for the in-phase and quadrature legs. The TE and TM polarized waves can be "interfered" in both the in-phase and quadrature legs.

Another aspect of the invention involves determining the amplitude and phase of the diffracted electromagnetic far fields for each polarization component. One method for determining the amplitude and phase is by a numerical method, which is preferably embodied in a computer program and includes several steps. First, several variables are determined and entered into the computer. The variables include: the wavelength of the focused light beam, the index of refraction of the incident medium (e.g., air), the index of refraction of the diffracting structure, the numerical aperture of the focusing lens, a description of the shape of the structure, and a choice of the type of polarization (e.g., transverse electric or magnetic field polarization). In addition, a maximum extent is selected for the surface of the structure which confines the numerical calculation to a truncated region. Generally, the truncated region is substantially larger than the wavelength divided by the numerical aperture of the focusing lens. An arbitrary spacing of grid of points along the surface of the structure is selected, and a set of basis functions is selected.

Second, lookup tables may be created. This step increases the speed of the computer program, but is not necessary, as the calculations in the third step can be performed (albeit more slowly) without the lookup tables. One such lookup table may include entries representing the geometry of the structure's surface contour. Another lookup table may include the distances along the surface contour from a reference point to each grid point. A third lookup table may include the abscissas and weights used repeatedly in the numerical integrations performed in the next step.

Third, numerical integrations are performed for surface contours of the structure. Each integration provides the tangential electric and magnetic fields along the structure's surface contour at some point. The integrand includes basis functions (preferably, sinc functions, where $\mathrm{sinc}(x)=\sin\pi x/\pi x$)) and a Green's function. The Green's function is a function of several of the variables input in the first step, such as the wavelength of the light beam and the indexes of refraction of the incident medium and the refracting medium. The number of sinc functions is preferably equal to the number of grid points.

Fourth, a matrix is constructed. Each matrix element is a numerical line integral along the whole surface contour of the structure. Thus, each matrix element includes a numerical integration of a 2-dimensional Green's function and a sinc function. The rows of the matrix represent the grid point on which the Green's function is centered, and the columns represent the grid point on which the sinc function is centered. The matrix accounts for electromagnetic fields and for the surface contour of the structure.

Fifth, the incident electromagnetic field at each grid point along the structure's surface contour is calculated, in known fashion. These incident field values are due only to the incident light beam at the surface contour and thus do not account for diffracted light. These incident field values become the elements of an incident field vector.

Sixth, the matrix is inverted and multiplied by the incident field vector to obtain the elements comprising a previously unknown vector. The unknown vector (a tangential electromagnetic field vector) accounts for diffraction of the light beam. The elements of the electromagnetic field vector represent the actual tangential electric and magnetic fields that are present along the surface contour.

Finally, the tangential electromagnetic field vector is used to calculate the diffracted electromagnetic far field. Both the amplitude and phase of the electromagnetic far field are a function of angle. It is not necessary to calculate both the electric and magnetic far fields. If either the electric or magnetic far field is calculated, as those skilled in the art will appreciate, the other far field can be derived using Maxwell's equations.

This numerical method provides the scattered electromagnetic far field for one polarization component (e.g., the TE component). The method can be repeated to obtain the scattered far field for the other polarization component. The final step is to calculate the phase difference in the Fourier Transform responses of the TE and TM fields and the corresponding in-phase and quadrature response.

An alternative method for determining the phase and amplitude of the electromagnetic far field involves the use of a sample with structures of known dimensions. Here, a set of reference structures is taken, for which the structural parameters are (preferably) precisely known. This reference structure is then measured using the present invention, and the electromagnetic far field polarization responses for the reference structures are determined. Other structures having at least one unknown structural parameter can then be measured in accordance with this invention, and the electromagnetic far field polarization response for each such structure can be compared to that for the reference structures. The unknown structural parameters can then be determined by comparing the measured response of the unknown parameters with the measured responses of the known reference structures. The unknown structural parameters will be most similar to the dimensions of that known reference structure for which the polarization quadrature measurements are most similar.

The present invention also includes methods for testing the stability and accuracy of the numerical method described above. The preferred method for testing the stability is known as a convergence test. The convergence test involves repeating the method for the same structure with an increasing and/or decreasing number (and thus spacing) of grid points. The truncation size of the structure can also be varied while repeating the method. Preferably, however, the truncated length of the structure is kept relatively short to reduce the total number of grid points and thus the time it takes to perform all the calculations. The numerical program is stable if the numerical solution converges (i.e., if the result does not change significantly when varying the number of grid points). The numerical accuracy can be estimated from the convergence data.

Another method for testing the accuracy of the numerical method uses the Fast Fourier Transform (FFT) of surface currents along the contour. The use of sinc functions for the basis functions of the surface current makes the implicit assumption that the surface current is strictly bandlimited in space. The Fourier Transforms should show a cutoff frequency if the surface currents are in fact bandlimited. The highest frequency bin will correspond to the cutoff frequency of the bandlimited functions, if a calculation is made of the FFT of the surface current coefficients, which estimate the tangential electromagnetic field along the contour. The FFTs of the surface current coefficients are then examined to determine whether they have significant amplitudes in the high frequency bins (e.g., by comparing those amplitudes to some expected amplitude). If so, it can be assumed that there is aliasing (i.e., that grid sampling is not being performed fast enough) and that the grid spacing must be decreased.

BRIEF DESCRIPTION OF THE DRAWINGS

These and other aspects of the invention will now be described in detail with reference to the accompanying drawings, wherein:

FIG. 19A is a top view of the groove showing its width and FIG. 19B is a side view showing the groove's shape.

FIG. 21A is calculated using the numerical integration method and FIG. 22B is measured data from the groove.

DESCRIPTION OF THE PREFERRED EMBODIMENTS

Figure 1:
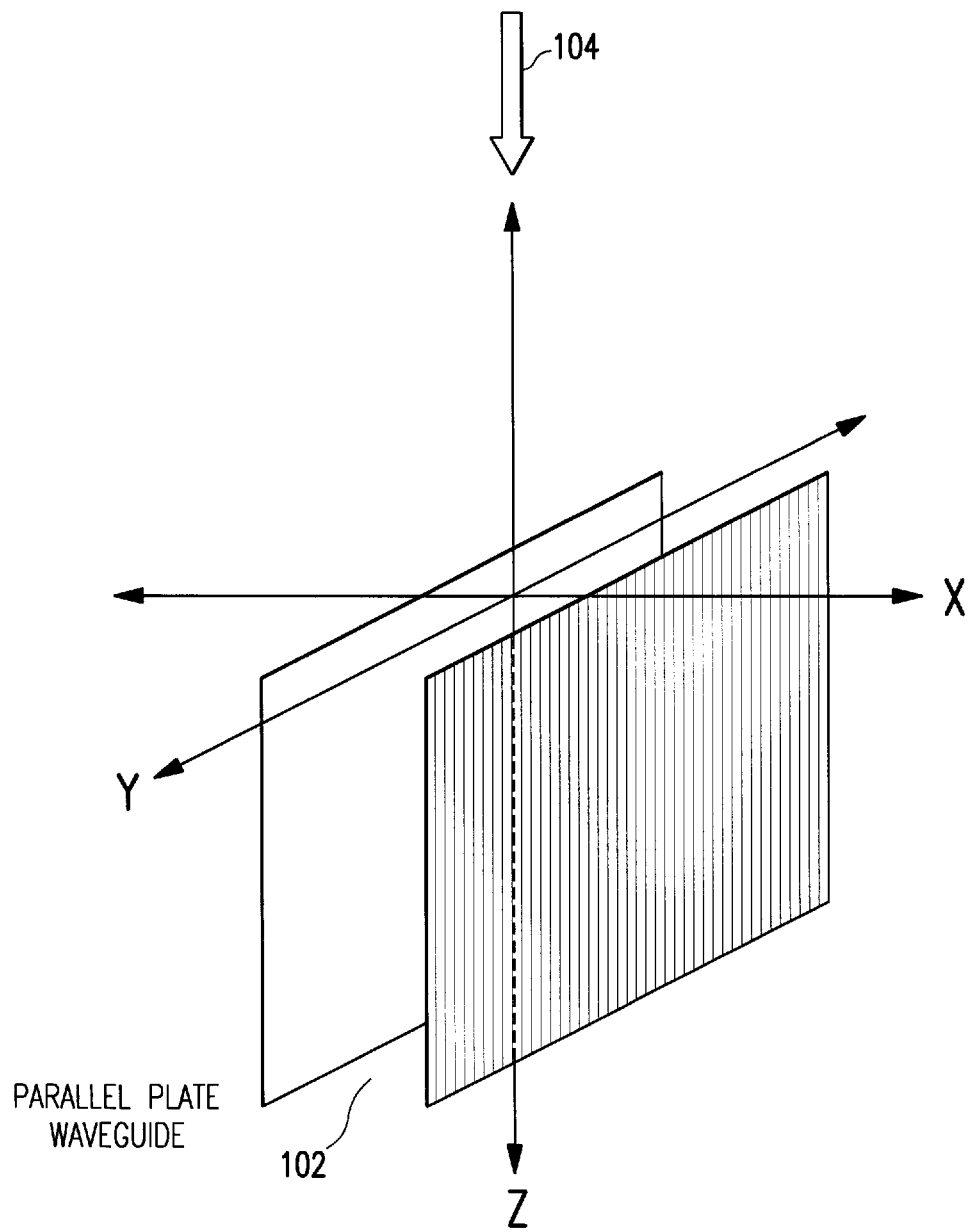
FIG. 1 shows a simple coordinate system for a plane parallel waveguide.

Throughout this description, the preferred embodiments and the examples shown should be considered as exemplars, rather than as limitations on the present invention.

I. Principles of the Invention

The system and method of the present invention involve an optical technique for measuring small structures, such as grooves and bumps on an integrated circuit or compact disc. The structure is illuminated with a beam of polarized, incident light that is diffracted off the structure. The structures have a plurality of lateral dimensions and at least one vertical dimension. As stated above, both the lateral and vertical dimensions of the structure will be generally referred to as "structural parameters." The term "structural parameter" may also refer to material (e.g., gold or silver) comprising the structure. Those dimensions may also be specifically referred to as lateral or vertical dimensions. The lateral dimensions may be the length and width of the structure, and the vertical dimension can be the height or depth of the structure.

At least one of the structural parameters is substantially greater than the wavelength ($\lambda$) of the light. For example, the length of the structure may be greater than the or equal to $2\lambda$. In addition, at least one other structural parameter is small enough, in comparison to $\lambda$, such that the amplitude and phase of the TE and TM fields of the diffracted incident light depend on the polarization of the incident light. This dependence may result, for example, when one of the structural parameters is approximately the same size as, or less than, the wavelength of the incident light. It should be understood that this latter structural parameter could be the height, width, depth, etc., of the structure.

The present invention can be used to measure structures like the deep capacitor trenches fabricated in a silicon substrate of a dynamic random access memory (DRAM) process. Integrated circuit contact holes are another example of structures that can be measured using the present invention. Contact holes are etched through oxide layers for the purpose of contacting a circuit device with metallization. Both DRAM capacitor trenches and contact holes are structures that have at least one very small lateral dimension that can be accurately and efficiently measured using the present invention.

Contact holes have a high "aspect ratio." In general, aspect ratio refers to the ratio of a longer structural parameter to a shorter structural parameter. Thus, the aspect ratio increases as a long structural parameter increases and/or a shorter structural parameter decreases. Specifically, the width of a contact hole can be as small as 0.25 microns, while the depth is several microns, meaning that this exemplary contact hole has a high aspect ratio.

DRAM capacitor trenches also have a high aspect ratio. A DRAM cell consists of a capacitor and a transistor. Some DRAM processes form the capacitor by etching a deep and narrow trench, depositing a thin oxide along the walls of the trench, and then filling the trench with a conducting material. The capacitor is formed along the walls of the trench. Thus, the depth is significantly larger than the width, giving the DRAM capacitor a high aspect ratio.

Quality control is important for both contact holes and DRAM capacitor trenches to ensure that they are of the desired dimensions. The depth of the contact hole is important, because the hole must make contact with the proper metal layer. The depth and shape of the DRAM trench capacitor are important, and the uniformity of the oxide layer is also important. These structures can currently be measured by electron beam microscopy. Electron microscopy is slow and expensive, however, making it impractical for inspecting every wafer during a fabrication process. Moreover, many electron beam microscope techniques require cutting the wafer to measure the structure's profile. Current optical microscopes can barely resolve these structures, and they do not provide accurate depth information. Interference methods are ineffective at measuring structures with high aspect ratios and do not work well at measuring the depth of structures in which the resolution limit is larger than the short structural parameter of the structure. As a result, a defective wafer cannot be detected until electrical tests are performed later in the fabrication process.

The optical technique of the present invention can be used to measure small structures, such as DRAM capacitor trenches and contact holes, with high aspect ratios. The technique employs a beam of incident light that is focused onto a structure to be measured. The incident light is preferably approximately monochromatic and preferably has polarization components approximately parallel and perpendicular to the long structural parameter of the structure. The electromagnetic field component, where the electric field is approximately parallel to the long structural parameter of the structure, will be referred to throughout this description as the transverse electric (TE) polarization. The approximately perpendicular polarization will be called the transverse magnetic (TM) polarization. Those skilled in the art will recognize, however, that the TE and TM polarizations can be reversed, and that the polarizations need not be parallel and perpendicular to the long structural parameter. The effect of diffraction of the illumination with the structure modulates the phase, amplitude, and polarization state of the reflected light. This technique can be used to measure individual and aperiodic structures.

A basic physical principle of this measurement technique is as follows: The diffraction properties for the polarization components of the incident light beam can be predicted if it is known that at least one of the structural parameters is small enough, with respect to the wavelength of the incident light, that the amplitude and phase of the diffracted TE and TM fields depend on the polarization of the incident light. The amplitude and phase behavior of each polarization component can be predicted numerically or measured from a known sample, as will be described in detail below. Therefore, the parameters of the structure can be determined by measuring the amplitude and phase relationship between the diffracted polarizations.

This technique can be used during fabrication of integrated circuits to measure small, high aspect ratio structures. For example, the technique can be used in situ for etching processes. The system of the present invention can also be designed to perform coherent or incoherent imaging of the structure. Incoherent imaging can be accommodated through the present technique because the phase measurement is self-referencing, allowing several structures to be measured in parallel.

II. Details of the System and Method

A simple example involving a plane parallel waveguide will first be explained to gain an intuitive understanding of the source of polarization differences. Then, this basic understanding is related to the measurement of aluminum grooves using the results of rigorous numerical diffraction computation. (The numerical computation method is described in detail below, in section III.) The system for detecting the diffracted light is then described, which detects the exact diffracted polarization amplitudes and phase differences. Finally, a description is provided for the results of a rigorous simulation of diffraction of focused deep ultraviolet (DUV) light focused onto a 0.25 micron silicon groove and the corresponding measured output.

A. Propagation of Polarizations in Waveguides

Two sets of allowable modes exist for electromagnetic propagation inside a plane parallel waveguide with perfectly conducting walls. The transverse electric (TE) modes have the electric field parallel to the walls. The transverse magnetic (TM) modes have the magnetic field parallel to the walls. FIG. 1 shows a plane parallel waveguide 102 with a simple coordinate system that is chosen for this analysis. The direction of propagation of the light beam 104 is in the z-direction, and the x-direction is perpendicular to the walls of a waveguide 102. The fields in this waveguide 102 consist of discrete modes, as restricted by the boundary conditions of the tangential electric field at the walls. The solutions for the electric field inside the waveguide for the TE case (electric field parallel to the wells) are:

$$E_y = \sin(p\pi x/d)e^{jk_z z}, k_2 = \sqrt{k^2 - \left(\frac{p\pi}{d}\right)^2} \qquad \text{Eq. 1}$$

where d is the width of the waveguide 102, and p is an integer. Alternately, the solutions when the magnetic field is parallel to the walls (TM case), are:

$$H_y = \cos(p\pi x/d)e^{jk_z z}, k_2 = \sqrt{k^2 - \left(\frac{p\pi}{d}\right)^2} \qquad \text{Eq. 2}$$

Each mode, corresponding to an integer value of p, has a cutoff width, $d_c^p = p\pi/k$. The value $k_z$ is imaginary for widths smaller than $d_c^p$, and the field amplitude weakens exponentially in the z-direction. The TE solution for the mode p=0 is $E_y=0$; there can be no TE fields. There is, however, a TM solution for p=0, namely: $H=e^{jkz}$. The cutoff width for the p=1 mode is $d_c^1=\lambda/2$, and both TE and TM have propagating solutions for this mode when $d>d_c^1$. Therefore, when $d<\lambda/2$, only evanescent TE waves can exist, while the TM zero mode can still propagate. Here lies the essential difference between the TE fields and the TM fields when considering the interaction of light with small trench structures. The TE fields can no longer penetrate the trench when the trench width falls below $\lambda/2$, while the TM fields can still propagate down the trench and back. The basic principle of the present invention is that, by measuring the amplitude and phase of one polarization with respect to another, the parameters of the trench can be deduced.

B. Aluminum Grooves with Varying Width

The above consideration of the waveguide explains why it might be expected that light of different polarizations would interact differently with an etched trench. Yet, it is clearly an abstraction and does not indicate what the diffraction of an illuminating spot focused on the trench will be. The present invention includes a rigorous, numerical method for calculating the diffracted electromagnetic fields for light focused onto arbitrary two dimensional structures.

(This numerical method, which is described in detail below in section III, is preferably emodied as a computer program.)

Grooves of varying width in aluminum will be analyzed to provide an example of optical diffraction. An actual aluminum groove could be a contact hole on which a thin film of aluminum is sputtered. The groove phase depth in this example was calculated as a function of groove width for a groove having a depth of $\lambda/4$ to study the effect of changing the groove width.

Figure 2:
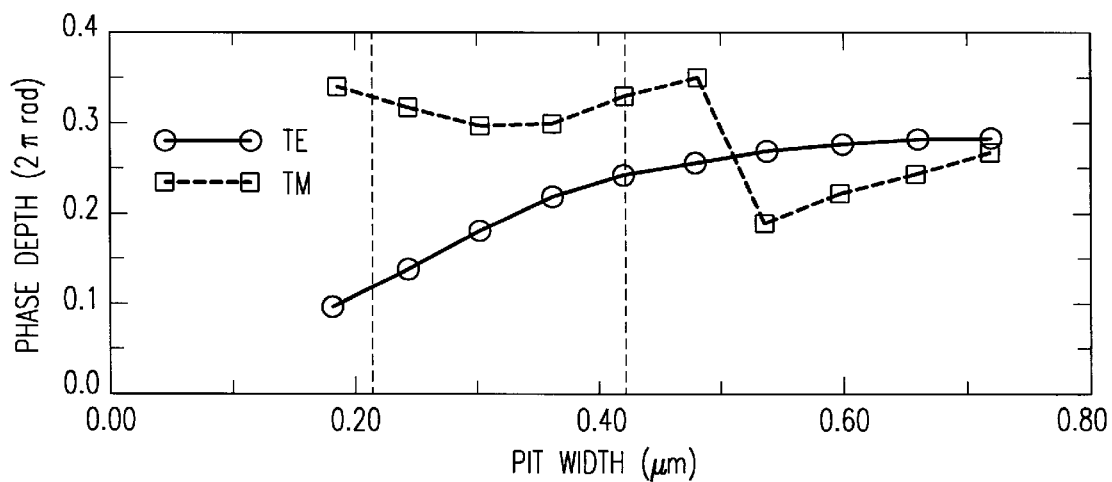
FIG. 2 is a graph plotting the pit phase depth for different pit widths of a structure, with the pit depth equal to a quarter-wave.

FIG. 2 is a plot of the pit phase depth for different pit widths, where the pit depth is equal to a $\lambda/4$. The phase depth is defined as the phase of the electric field at the bottom of the groove. It is expected, from scalar diffraction considerations, that the phase depth of a groove would simply be the groove depth compared to the wavelength of the illuminating light. The results depicted in FIG. 2, however, show that the polarization state has a significant effect on the diffraction. This is apparent in the region where the pit width varies between $\lambda/2$ and $\lambda$, where $\lambda$ is adjusted for the index of refraction of the incident medium. The phase depth of the TM wave in that region remains fairly constant, while the phase depth of the TE wave increases close to the quarter-wave depth of the pit. Therefore, the pit width appears to be crucial to the penetration of the TE wave into the pit.

C. Polarization Quadrature Measurement (PQM)

1. Principles of PQM

The present invention utilizes a method referred to in this description as "polarization quadrature measurement" or "PQM." The fundamental idea behind PQM is to measure the amplitude and phase of the TM diffracted far field with respect to the TE field. The previous simulation showed that TE polarized light and the TM polarized light each see a structure (e.g., a groove) with a different effective depth when illuminating the groove. Therefore, respective far fields of the TM and TE polarized lights will have different amplitudes and phases. The amplitude and phase of the diffracted far field depends on the phase depth of the groove and the proportion of incident light that is diffracted off the bottom of the groove and the surface around the groove. The numerical method described below in section III can also be used to calculate the diffracted far field for each polarization.

Normally, the phase of an optical field cannot be detected without interfering it with a reference optical field. The diffracting structure is illuminated in PQM measurement with both TE polarized and TM polarized fields. The TE field can be used as a reference to analyze the phase and amplitude change in the TM field, because the TM and TE fields are differently affected by the diffraction. Those skilled in the art will recognize that, conversely, the TM field can be used as a reference to analyze the TE field. Measuring the relationship between the two orthogonally polarized fields is similar to the principle of conoscopic holography, which is known in the art and described in Sirat & Psaltis, "Conoscopic Holography," Optics Letters, Vol. 10, p.4 (1985).

The advantage of using the TE field as a reference, rather than constructing a traditional interferometer by splitting off part of the TM field before the diffraction and interfering the two parts, is that coherence length, stability, and vibrations are not an issue. Another advantage is the ease of measuring both the in-phase and quadrature components. To measure both in-phase and quadrature components of an electromagnetic field using traditional interferometry would require a separate reference leg with an optical path length one-quarter wave different from the first reference leg.

Figure 3A:
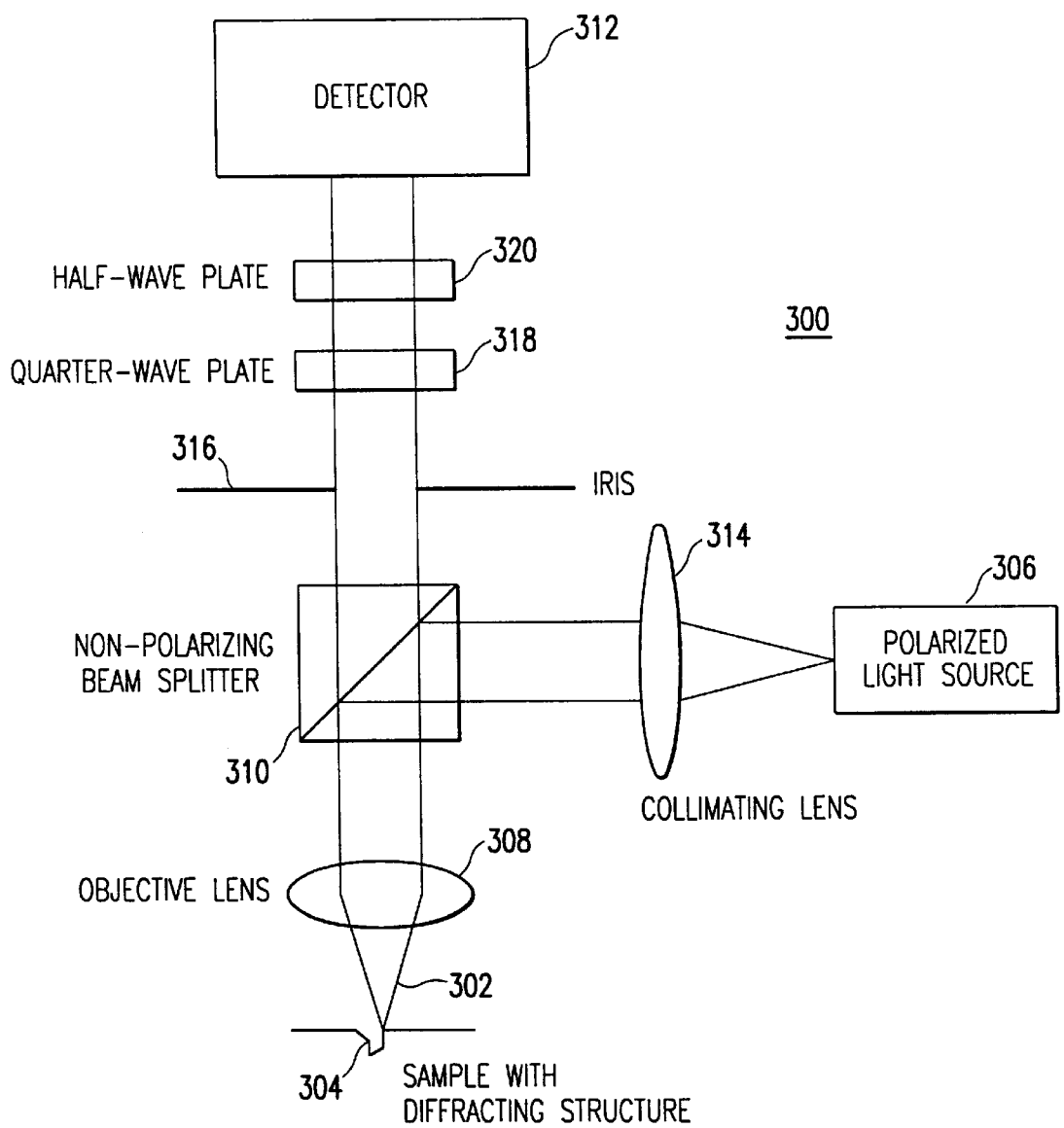
FIGS. 3A–3B show two embodiments of a detector for polarization quadrature measurement in accordance with the present invention, in which light is reflected off a structure.
Figure 3B:
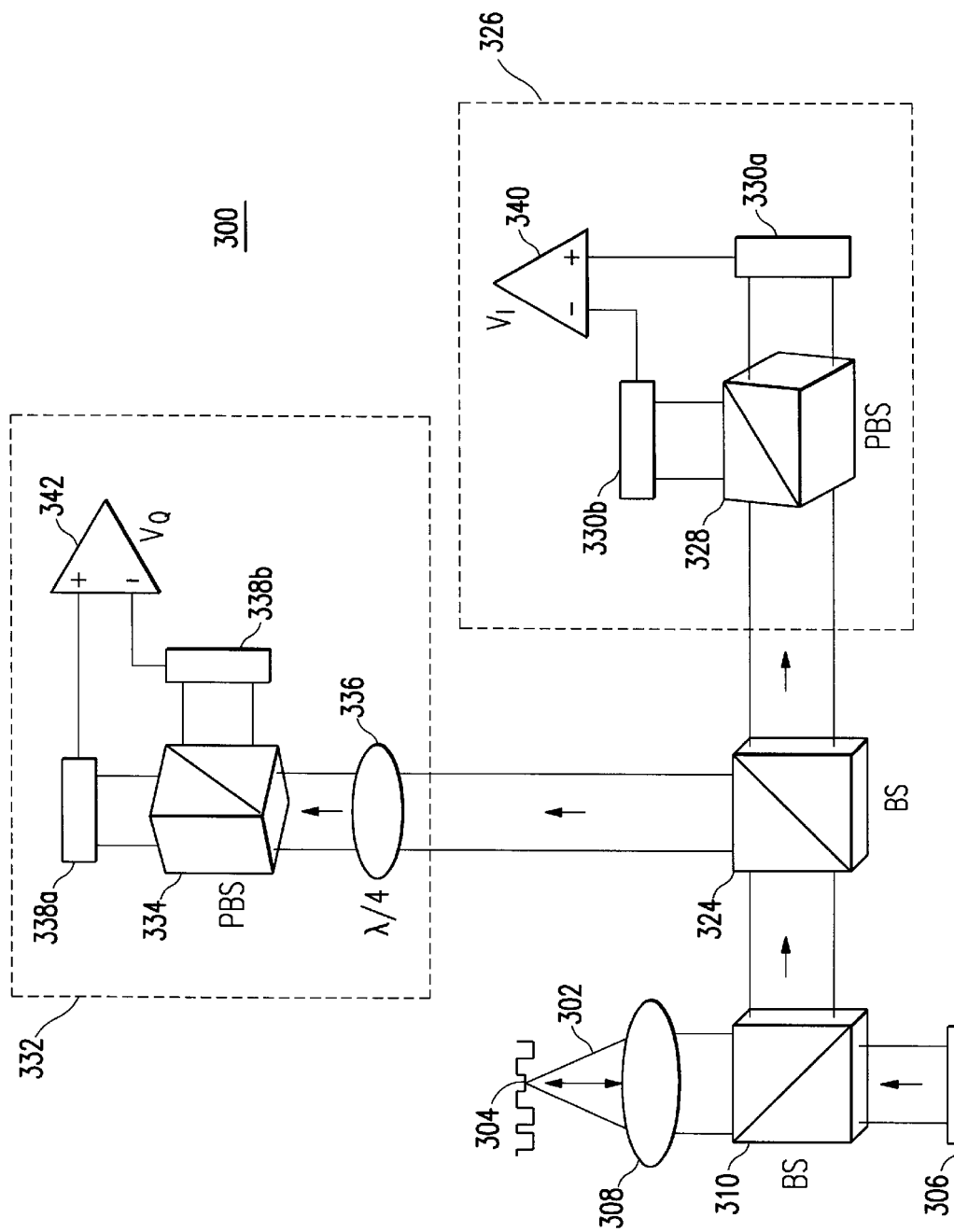

Consider the electric field at the center of the far field propagating in the z-direction (with the z-direction oriented as shown in FIG. 1). It will be assumed that a single plane wave is present, because, in reality, an aperture can always be placed on the detector in the Fourier plane to restrict spatial components. The electric fields and corresponding detector voltages used in the following formulation, if desired, can be considered as functions of far field angle. In addition, the convention will be used that the TE reflected field is polarized in the x-direction, so that the TM electric field points in the y-direction. Consequently, the total electric far field is:

$$E = \alpha_e e^{j\Phi_e} \hat{x} + \alpha_m e^{j\Phi_m} \hat{y} \qquad \text{Eq. 3}$$

where the factor of $e^{j(kz-\omega t)}$ has been ignored. The convention will also be used that the long structural parameter of the groove is in the x-direction. Thus, the TE electric field is $\alpha_e e^{j\Phi_e}$, and the TM electric field is $\alpha_m e^{j\Phi_m}$ 2. The PQM Detector System FIGS. 3A–3B show two embodiments of a PQM detector system 300 of the present invention, in which the incident light beam 302 is reflected off the structure 304 to be measured. The reflecting system 300 includes a polarized light source 306, a lens 308 for focusing the incident light beam 302 onto the structure 304, and a non-polarizing beam splitter 310. The system also includes a quadrature polarization detector 312.

FIG. 3A shows a relatively simple embodiment of the PQM system 300 for measuring the reflected polarization states of the incident light beam 302. The system 300 includes a polarized light source 306 that generates a beam of polarized light that is directed onto a collimating lens 314. The polarized light is transmitted through the collimating lens 314 onto a non-polarizing beam splitter 310, which redirects the light beam onto the objective lens 308. The objective lens 308, in turn, focusses the light beam 302 onto the structure 304 being measured. The light beam then reflects off the structure 304, back through the objective lens 308, and through the beam splitter 310. The light beam then passes through an iris 316, through a quarter-wave plate 318, and through a half-wave plate 320. The polarizer/analyzer is after the half-wave plate 320 and before a detector element 322. The light then enters the detector element 322. The in-phase and quadrature components are derived from four detector measurements. Each detector measurement corresponds to a different setting of the $\lambda/2$ plate 320 and the $\lambda/4$ plate 318. These four settings lead to Equations 4, 5, 6 and 7(*a*) and 7(*b*).

Another embodiment of the PQM detector system 300 is shown in FIG. 3B, in which both the in-phase and quadrature components of the TM far field are detected using the TE field as a reference. The beam of polarized light in this system is generated by the polarized light source 306 and is transmitted through a beam splitter 310. The light then passes through an objective lens 308, which focusses the light beam 302 onto the structure 304. The light beam then reflects off the structure 304, back through the lens 308, and is diffracted through the beam splitter 310. The light then enters another non-polarizing beam splitter 324, where the light is split into in-phase and quadrature phase components. The in-phase leg 326 of the system includes a polarizing beam splitter 328 rotated 45° with respect to the z-axis, as shown in FIG. 3B. This rotated beam splitter 328 "interferes" the TE and TM polarized waves, which are then detected by two detector elements 330*a*, 330*b*.

The quadrature leg 332 also includes a polarizing beam splitter 334 rotated 45° with respect to the z-axis as well as a quarter-wave plate 336. The quarter-wave plate 336 retards the TE component by ¼ wave with respect to the TM component. As a result, the electric field in the quadrature leg 332 is:

$$E_2 = \alpha_e e^{j(\phi_e + \pi/2)} \hat{x} + \alpha_m e^{j\phi_m} \hat{y} \qquad \text{Eq. 4}$$

The $\pi/2$ phase shift in the reference results from the quarter-wave retardation and leads to the quadrature detection. The sign bias due to measuring the intensity in both legs 326, 332 is removed by subtracting the complementary outputs of the polarizing beam splitters 328, 334. The voltages at detectors 330a and 338a are:

$$V_{A,C} \alpha |\bar{E}_{1,2} \cdot (\hat{x} + \hat{y})/\sqrt{2}|^2 \qquad \text{Eq. 5}$$

and the voltages at detectors 330b and 338b are:

$$V_{B,D} \alpha |\bar{E}_{1,2} \cdot (-\hat{x} + \hat{y})/\sqrt{2}|^2 \qquad \text{Eq. 6}$$

The differential amplifiers 340, 342 in each leg 326, 332 subtract the bias terms inherent in measuring intensity. The resulting in-phase and quadrature voltages appearing at the outputs of the differential amplifiers 340, 342 are:

$$V_I = V_A - V_B = \alpha_e \alpha_m \cos(\phi_e - \phi_m) \qquad \text{Eq. 7a}$$

$$V_Q = V_C - V_D = \alpha_e \alpha_m \sin(\phi_e - \phi_m) \qquad \text{Eq. 7b}$$

As long as $a_e$, $a_m$, and $\phi_e - \phi_m$ remain stable, this PQM detector 300 will measure both the in-phase and quadrature components of the TM field with respect to the TE field. The terms $a_e$ or $a_m$ can be normalized by adding to the detector a third leg with an untilted polarizing beam splitter, if those terms are somehow noisy. This causes $a_e$ and $a_m$ to be measured independently, and $V_I$ and $V_Q$ can be normalized. There is no simple way to also account for instability in the phases of the far fields. No reason exists, however, for the TE and TM fields to become incoherent, because those fields travel identical paths.

Figure 4:
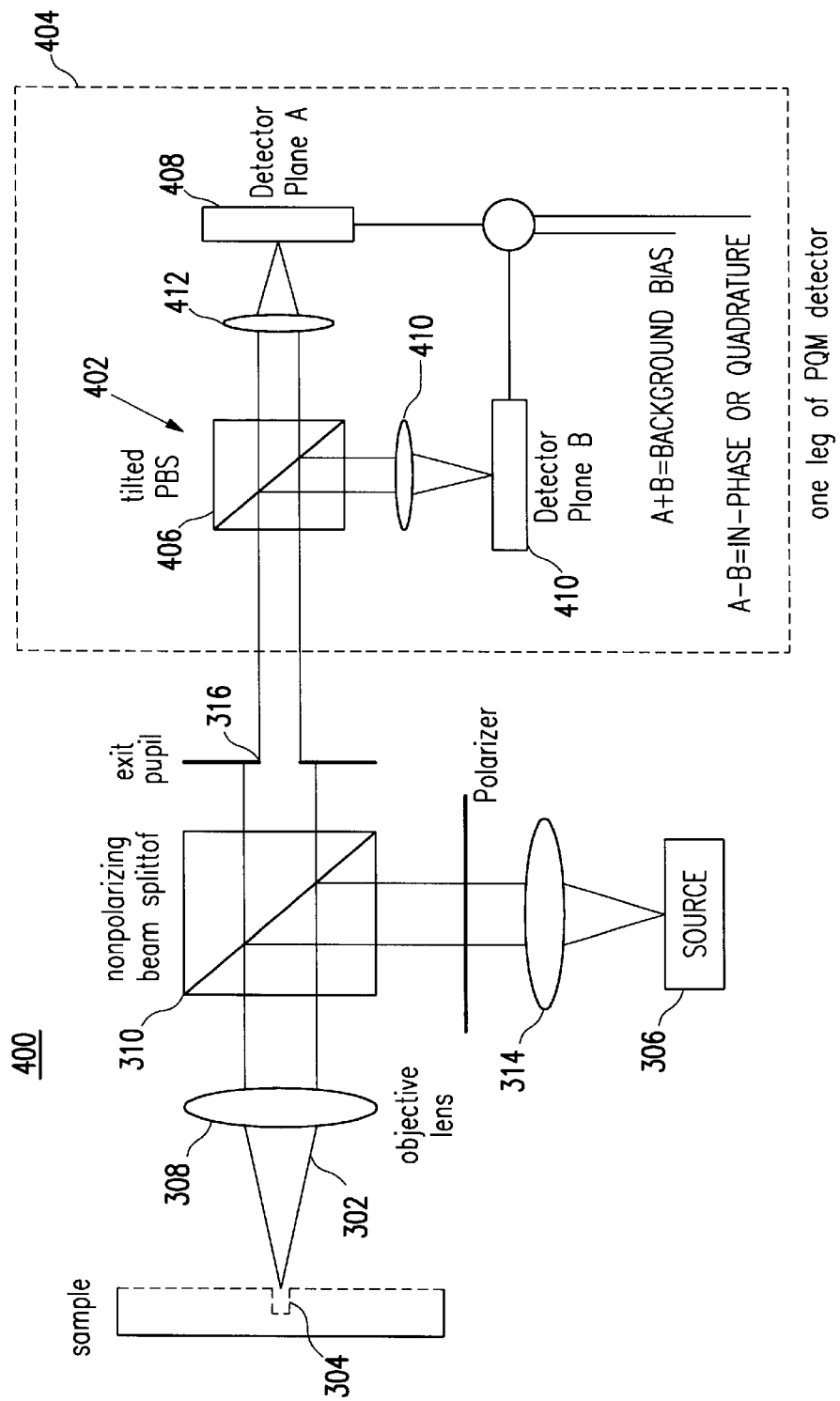
FIG. 4 shows another embodiment of a detector for polarization quadrature measurement in accordance with the present invention, in which lenses are added to allow imaging as in a conventional microscope.

FIG. 4 shows another embodiment of a PQM detector 400, illustrating only one leg 402. The detector 400 has a light source 306, a collimating lens 314, a non-polarizing beam splitter 310, and an objective lens 308, as in the detectors of FIGS. 3A and 3B. The light beam 302 reflects off a structure 304, back through the beam splitter 310, into an exit pupil (or iris) 316, and into a detector assembly 404. The detector assembly 404 has a tilted beam splitter 406 and two detector elements 408, 410. Lenses 412, 414 are added between the beam splitter 406 and the detector elements 408, 410 to allow the PQM detector 400 to image like a conventional microscope. As a result, the PQM response can be imaged onto a detector in an array of detectors, allowing measurement for as many structures in parallel as can be handled by the optical imaging system and detector array.

Many alternative embodiments exist for the PQM detector 300. For example, the non-polarizing beam splitter 324 and one polarizing beam splitter (328 or 334) can be eliminated if the quarter-wave plate is cut in half and only retards the x-direction polarization of half the beam. Then, the detector planes would also have to be cut in half; one half would be for the in-phase signal and the other for the quadrature signal.

Figure 5:
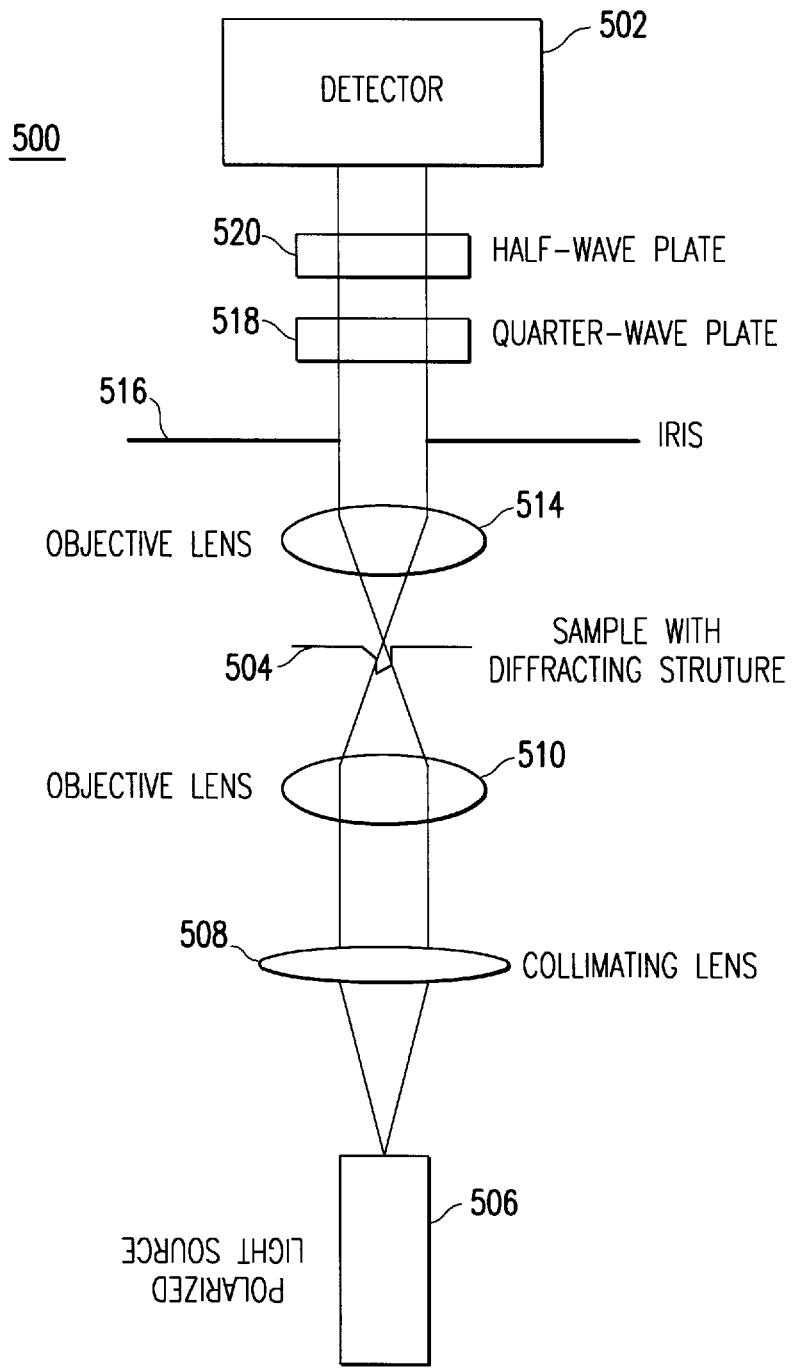
FIG. 5 shows another detector for polarization quadrature measurement in accordance with the present invention, in which light is transmitted through the structure.

Another embodiment of the PQM detector is a transmission system 500, as shown in FIG. 5. There, the detector assembly 502 is placed behind a sample with a diffracting structure 504. A polarized light source 506, a collimating lens 508, and an objective lens 510 are placed in front of the structure 504. The light beam 512 is focused onto the structure 504, through which the light beam is transmitted to an objective lens 514 on the other side of the structure 504. The beam then passes through an iris 516, and through a quarter-wave plate 518 and a half-wave plate 520. A detector 522 detects the polarized light. The transmitting detector 500 allows the first nonpolarizing beam splitter 324 of FIGS. 3A and 3B to be eliminated.

D. Considerations and Simulation for Silicon Structures

The previous example in section II.B of diffraction from a groove was for an aluminum structure with visible red light. Silicon is only about 30% reflective at the wavelength of visible red light. As a result, the walls of the silicon structure absorb a great deal of the light. Thus, most of the incident light of a red spot that is focused onto a silicon structure having a depth greater than about one wavelength is never reflected back out of the structure. There can be no PQM signal if the structure absorbs all of the incident light.

A solution is to illuminate the groove with deep ultraviolet (DUV) light. As an example, a KrF excimer laser emits light at a wavelength of 248 nm, and a high pressure mercury arc lamp can emit light at 257 nm. Both of these sources are commercially available and currently being used in microelectronic lithography. Silicon is very conductive at these wavelengths. In addition, its reflectivity increases to about 70%. Another benefit of using the DUV light is that the numerical aperture requirements of the illuminating system can be relaxed, because the illuminating spot size is approximately the wavelength of the DUV light divided by the numerical aperture.

A simulation was performed for the TE/TM quadrature detector response to a silicon groove having a width of 0.25 micron, where the groove depth is increasing. The simulation was performed with light having a wavelength of 248 nm, corresponding to a KrF excimer laser, because silicon is very reflective at DUV wavelengths. Illuminating the groove with light at a wavelength where silicon is most reflective gives the best measurement signal, because the reflected light is being measured. The index of refraction of silicon at a wavelength of 248 nm is about 1.6+j3.6.

Figure 6:
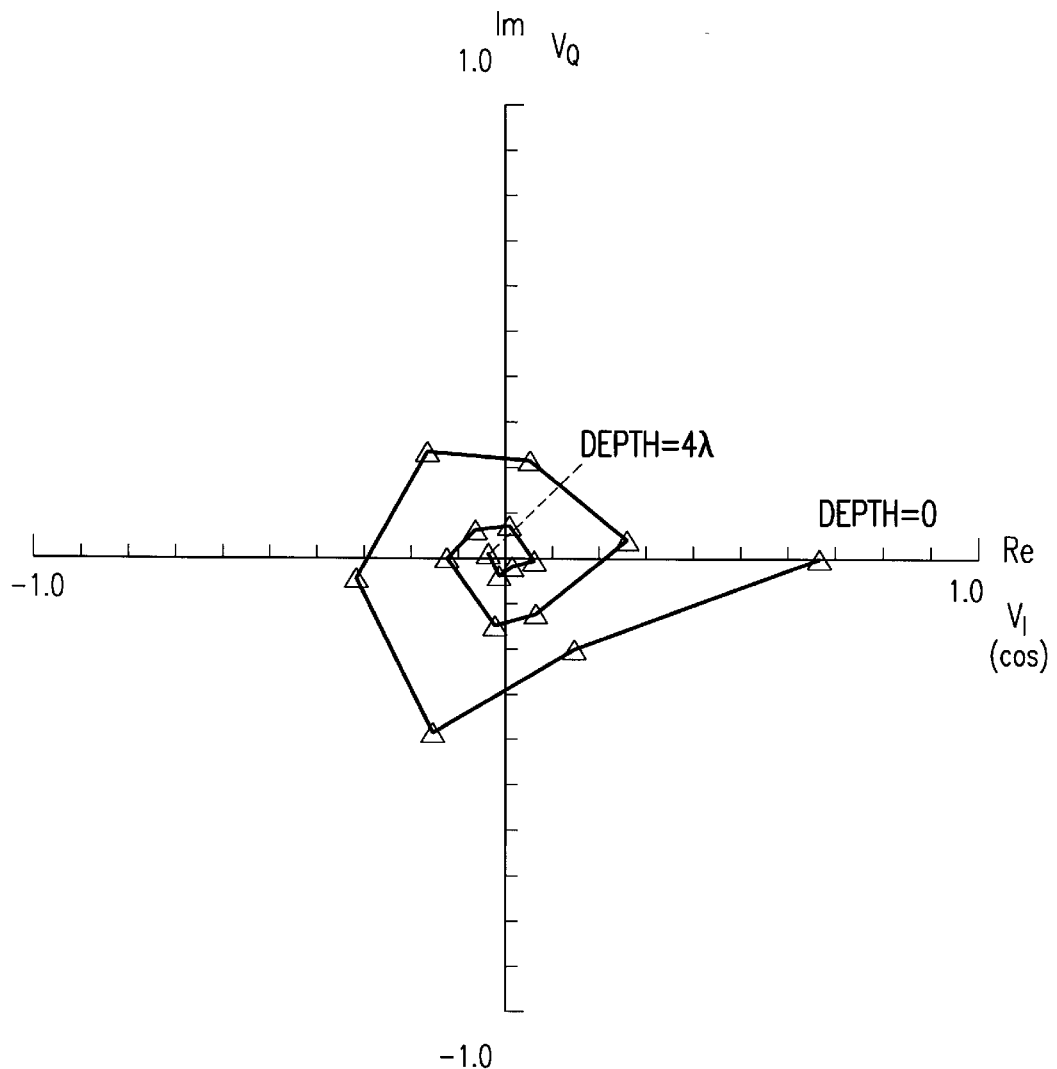
FIG. 6 is a graph showing the TE/TM quadrature response for a groove, in which the depth varies from zero to four wavelengths.

FIG. 6 shows the TE/TM quadrature response for the simulation for the 0.25 micron wide groove, in which depth is varied from $0\lambda$ to $4\lambda$ (0.992 micron). The depth was incremented in steps of $\lambda/4$. The numerical aperture for the incident light was 0.6. The numerical aperture for collecting the reflected light was 0.1. The horizontal axis of the graph shows the in-phase voltage, $V_I$, from the PQM detector, and the vertical axis shows the quadrature voltage output, of $V_Q$. Each of the plotted points, represented by a triangle, is for a different trench depth in the calculation. Thus, the ($V_I$, $V_Q$) coordinate corresponds to the detector response for that trench depth.

The graph of FIG. 6 shows how the phase difference between the diffracted TE and TM far fields rotates as the trench deepens, causing a spiral curve. The starting point is for the groove depth equal to $0\lambda$, and the end point is for the groove depth equal to $4\lambda$. Both polarizations have identical reflection when no structure is present, resulting in maximum in-phase voltage and zero quadrature voltage. (This point is labeled "depth=0".) The TE electric field does not penetrate as far into the groove as the TM component as the groove deepens. Therefore, the reflected TE field does not suffer as large a phase retardation as the reflected TM field. In addition, the amount of light of each polarization that is absorbed by the structure is different, resulting in different reflected amplitudes for the two polarizations. Each point in the graph represents the voltage pair ($V_I$ and $V_Q$) for a different groove depth.

The voltage pairs spiral counterclockwise as the groove deepens, because the TM field is phase retarded more than the TE field. The spiral is inward because deeper grooves absorb more light, reducing the reflected amplitudes. These differences of absorption and phase are measured by the PQM detector 300, resulting in the voltage pattern shown.

The operator of an integrated circuit assembly line could precisely stop the etching process at a particular groove depth by watching the detector output if the measurement of the trench could be made in situ. An instrument would measure the PQM voltage pair for each trench if the measurement is not made in situ. The trench passes if the measured voltage pair equals the expected voltage pair. Otherwise, the etching process has been defective.

There is no requirement for a coherent source for the PQM measurement. The TE and TM fields travel exactly the same optical path. Therefore, coherence length is not an issue.

In fact, there may be an advantage to using an incoherent source. The reflection of each trench can be imaged in parallel with coherent imaging.

As described above, FIG. 4 shows a PQM detector system 400 for measuring the parameters of a trench. The added lenses 412, 414 before the detectors 408, 410 allow imaging as in a traditional microscope. The PQM response for each trench can be imaged onto a detector (such as the one shown in FIG. 4) in an array of detectors by placing the lenses 412, 414 in the PQM system. The PQM response can be measured in this way for as many trenches in parallel as the optical imaging system and detector array can handle.

Optical disc memories consist of marks, or pits, embossed on a plastic substrate and then covered with a thin aluminum film. The marks are arranged in circular tracks so that the rotation of the disc causes the marks to move under a tightly focused illumination spot. Currently, the marks are designed so that when one is illuminated, a small amount of reflected light is directed back toward the objective lens. All the incident light is reflected back when no mark is present. Therefore, each mark on a current optical disc memory has two possible states—high reflectivity and low reflectivity. Therefore, each mark represents one bit of information. The overall capacity of an optical disc memory, in terms of bits of information, is approximately the total number of marks that can fit on one disc.

If marks could be designed to have different effects on the two different polarizations (polarizations in this case being defined by the direction of the electric field being either parallel or perpendicular to the track direction), then polarization quadrature could be used to determine the presence of a mark. For example, instead of a mark having two possible states—mark or no mark—a mark could be one of four possible states. The four different states would each correspond to a different ($V_i$, $V_q$) pair in the polarization quadrature detector. In this case, each mark would now represent two bits of information, and the overall storage capacity of the disc would double.

In fact, marks with different effects on polarization already exist. The width of the pits used in the new digital video disc (DVD) is less than half the wavelength of the illuminating light. As described in section II.A above, when the width of a reflecting groove falls below half the wavelength, the phase of the reflected light for each polarization is differently affected by the pit's depth. Therefore, three different pit depths (plus the possibility of no pit) could be chosen which have the following polarization properties:

|  | Parallel Polarization Reflected Power | Perpendicular Polarization Reflected Power |
| --- | --- | --- |
| no pit | large | large |
| 1st pit depth | small | large |
| 2nd pit depth | small | small |
| 3rd pit depth | large | small |

Since each mark can be one of four possibilities, each represents two bits of information. This basic principle can be enlarged so that each mark can be one of many possibilities, representing many bits of information. Each possible state for a mark will correspond to a different constellation point for the polarization quadrature detector. This scheme is very analogous to quadrature amplitude modulation schemes used in telecommunications.

III. Numerical Method for Determining the Amplitude and Phase of the Diffracted Far Fields An accurate tool for modeling diffraction would be a useful tool for the present invention. An accurate diffraction model enables the design of structures with desirable far field properties. For example, patterns can be located that have far fields that are maximally separated. Such patterns might be useful in the design of an optical memory. Another use of a model is to explain various diffraction phenomena. Other uses include the inspection of submicron features fabricated in the microelectronics industry and for the analysis of optical memory formats.

Figure 7:
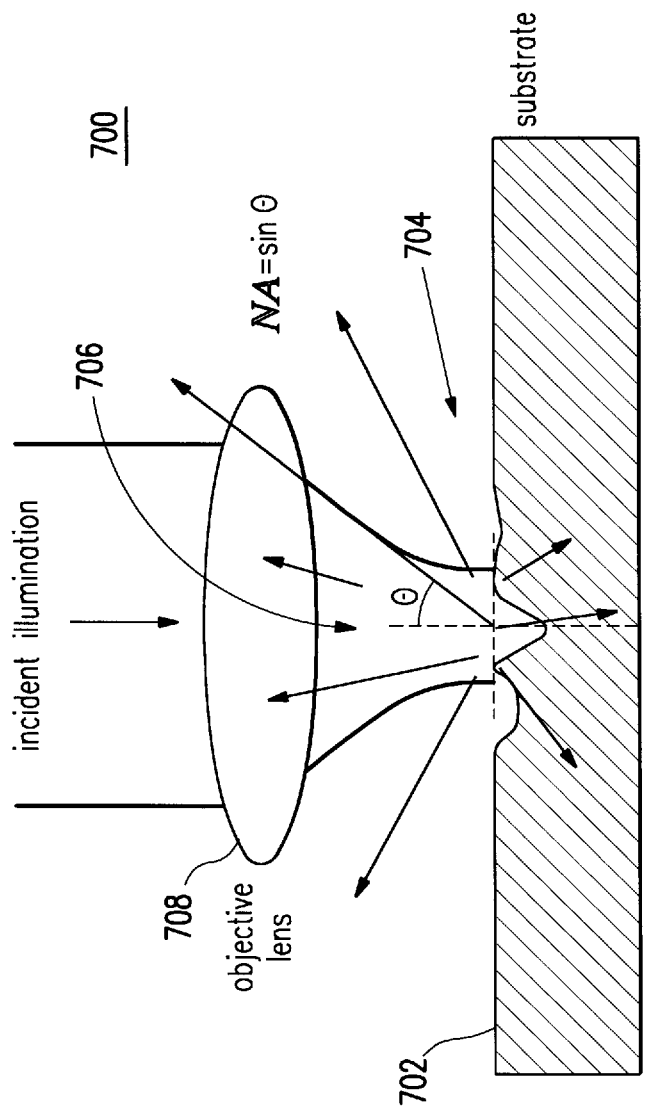
FIG. 7 shows a diffraction model.

FIG. 7 shows a diffraction model 700. The model includes substrate surface 702 with a known contour and an incident field 704 resulting from a beam 706 focused through an objective lens 708 with a known numerical aperture. Most numerical diffraction approaches, such as the coupled-wave and coupled-mode methods, require a periodic diffracting structure and a plane wave incident field. These approaches could be used for a focused incident spot on a single structure by making the grating period large and separately accounting for each plane wave that makes up the focused spot. The number of orders, however, required in the diffraction calculation, because of the large period, will cause a burden on time and memory of the computation. This computation time must be multiplied by the number of plane waves that are to be considered in composing the focused spot. Therefore, a more direct integration technique was pursued in the present invention. This technique will allow the diffraction to be calculated directly from the focused incident field and a single groove.

Other alternatives to the integral method are finite differences, finite difference time domain, and finite element analysis. The advantages of these methods are that numerical integrations are not required, and, for finite differences, the formulation is somewhat simpler. The disadvantages of these methods are that grid points are placed throughout the whole volume of the structure, rather than just on the surface, as in the integral method. The matrices become very large, although sparse, with such a large number of grid points. Other problems also arise with these methods, such as questions concerning the convergence properties and concerning how to restrict the structural boundaries, which are at infinity.

Thus, a numerical diffraction method was developed in the present invention based on coupled integral equations. The mathematical formulation begins with Maxwell's equations and derives expressions for the electric and magnetic fields inside a volume. Each expression involves a convolution of the tangential fields on the volume's surface with the electromagnetic Green's function. These same expressions are written a second time to use the tangential surface fields to calculate the fields outside the volume. Coupled integral equations are formed for the tangential fields themselves after matching boundary conditions by equating the tangential components of the fields on either side of the surface (inside and outside the volume).

Several methods of testing the results of this numerical integration method have been developed and will be described below. In addition, the results of this numerical method will be compared below to experimental diffraction measurements.

A. The Basic Steps of the Numerical Integration Method

The numerical method can be used to determine the amplitude and phase of the diffracted electromagnetic far fields for each polarization component. The numerical method is preferably embodied in a computer program and includes several steps, as shown in FIG. 8.

Figure 8:
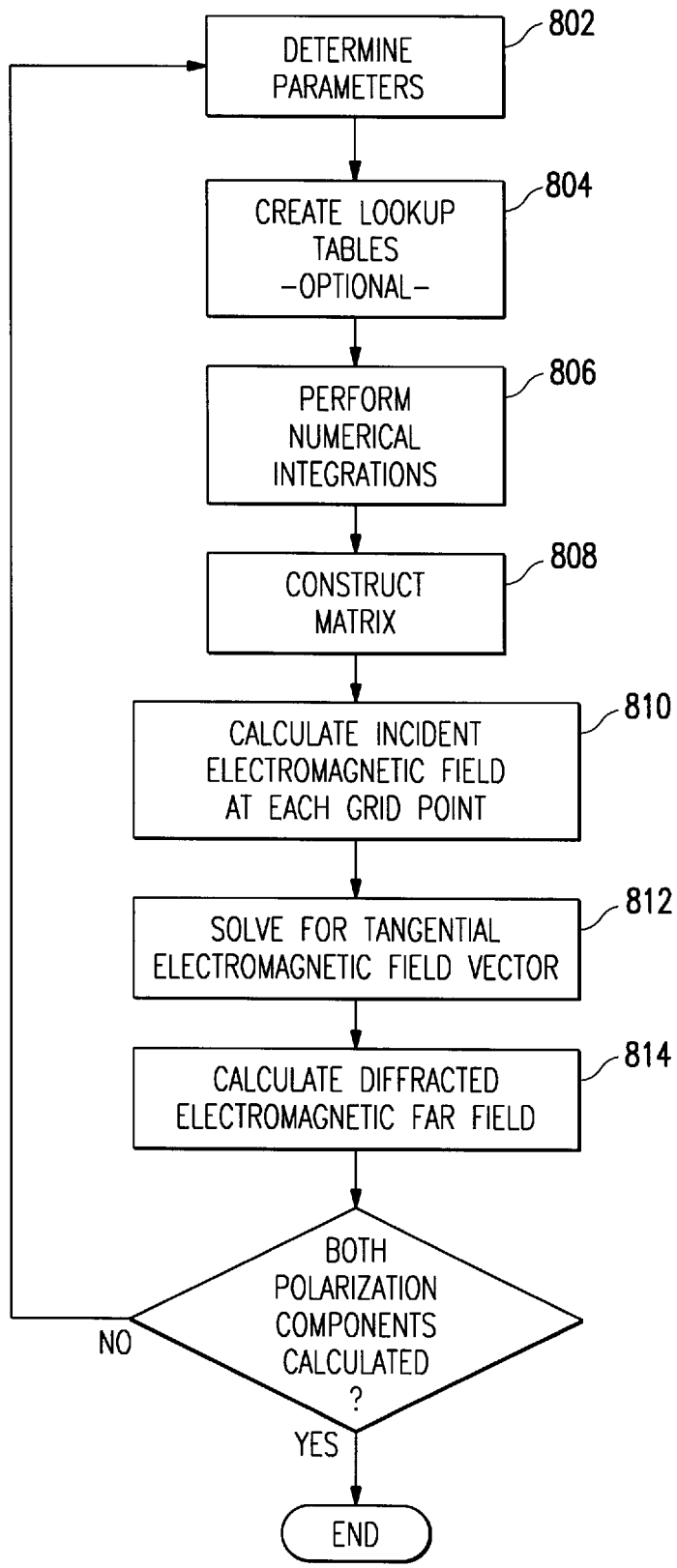
FIG. 8 is a flow diagram for the preferred numerical integration method for determining the amplitude and phase of the diffracted electromagnetic far field for each polarization component.

The first step 802 of the method shown in FIG. 8 is to determine several variables, which are preferably entered into the computer. The variables include: the wavelength of the focused light beam, the index of refraction of the incident medium (e.g., air), the index of refraction of the diffracting structure, the numerical aperture of the focusing lens, a description of the shape of the structure, and a choice of the type of polarization. An arbitrary spacing of grid of points along the surface of the structure is also selected, and a set of basis functions is selected. The maximum extent of the grid truncates the structure's surface.

Figure 10:
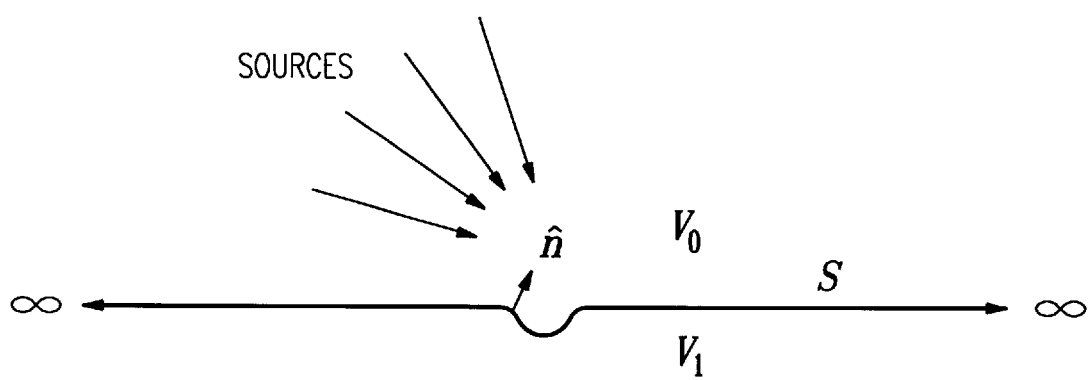
FIG. 10 shows a diffracting surface of a structure with the incident field generated by distant sources.

A description of the shape of the structure is also determined in the first step 802. This is done using mathematical functions, for example, cosine or super-Gaussian functions. FIG. 10 shows that the light beam is traveling in the z-direction toward the structure. A good approximation of the surface contour can be obtained by selecting different values of x, selecting a function that best approximates the structure, and setting z=function(x). For example, z=cos(x) may be selected if that function best approximates the cross-sectional shape of the structure. A super-Gaussian function works well for approximating a groove. Alternatively, some actual measurement of the structure could be taken.

Figure 11:
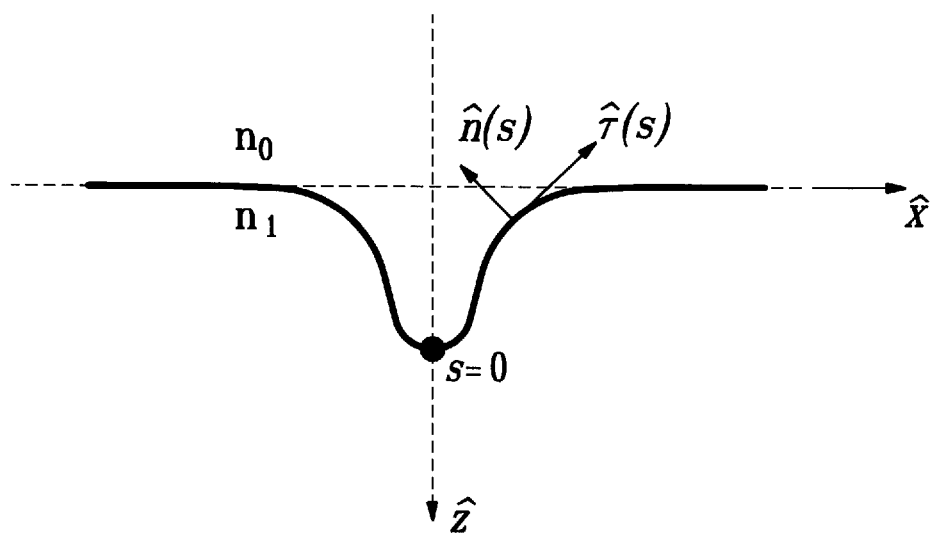
FIG. 11 is a graph showing the coordinate systems for a two-dimensional diffracting structure.

An optional second step 804 involves creating lookup tables. This step 804 increases the speed of the computer program, but is not necessary, because the calculations in the integration step 806 can be performed (albeit more slowly) without lookup tables. One such lookup table may include entries representing the geometry of the structure's surface contour. For example, this table could include the geometry of the structure's surface contour in the x- and z-directions. Another lookup table may include the distances along the surface contour from a reference point to each grid point. FIG. 11 shows these distances represented by "s", which is the distance along the structure from the z-axis to a point on the structure, where s is a function of x. A third lookup table may include the abscissas and weights used repeatedly in the numerical integrations.

Numerical integrations are performed in the third step 806. The numerical integrations are for surface contours of the structure. Each integration provides the tangential electric and magnetic fields at some point along the structure's surface contour. The integrand includes basis functions (preferably, sinc functions) and Green's functions. The Green's functions include various parameters, such as the wavelength of the light beam and the indices of refraction of the incident medium and the refracting medium. The integrand may also include the derivatives of the basis and Green's functions. These derivatives implicitly involve the geometry of the structure. The number of sinc functions is preferably equal to the number of grid points, where sinc(x) is centered on each grid point.

A matrix is constructed in the fourth step 808. Each matrix element is a numerical line integral along the whole surface contour of the structure. Thus, each matrix element includes a numerical integrations of 2-dimensional Green's functions and the sinc functions. The rows of the matrix represent the grid point on which the Green's functions are centered. The columns represent the grid point on which the sinc functions are centered.

The incident electromagnetic field at each grid point along the structure's surface contour is calculated in the fifth step 810, in known fashion. These incident field values are due only to the incident light beam at the surface contour and thus do not account for diffracted light. These incident field values become the elements of an incident field vector.

The sixth step 812 involves solving for a previously unknown tangential electromagnetic field vector by inverting the matrix and multiplying it by the incident field vector. The tangential electromagnetic field vector accounts for diffraction of the light beam. The elements of the vector represent the actual tangential electric and magnetic fields that are present along the surface contour.

The seventh (and final) step 814 uses the tangential electromagnetic field vector to calculate the diffracted electromagnetic far field. The far fields must be measured because the electric and magnetic fields cannot be measured at the surface contour. The amplitude and phase of the electromagnetic far field are both a function of angle. Both the electric and magnetic far fields need not be calculated, however, because, if one such field is calculated, the other field can be derived using Maxwell's equations.

Performing steps 802–814 provides the scattered electromagnetic far field for one polarization component. The method can be repeated (816) if the scattered far field for the other polarization component has not yet been calculated. The method is complete (818) when the far field for both components has been calculated.

B. Details of the Numerical Integration Method

The formulation for the integral method of numerical diffraction is described in detail by A. T. de Hoop, "Modern Topics in Electromagnetics and Antennas," PPL Conference Publication 13, peter Peregrinus, Ltd., Stevenage, England, 1977, Ch. 6, and J. Pasman, "Principles of Optical Disc Systems," Adam Hilger Ltd., 1985, Ch. 6. Specific operator matrices for the two polarizations in two dimensional diffraction problems are given in the appendix of J. G. Dil and B. A. Jacobs, "Apparent Size of Reflecting Polygonal Obstacles of the Order of One Wavelength," J.Opt.Soc.Am., Vol. 69, No. 7, 1979, at 950.

Figure 9:
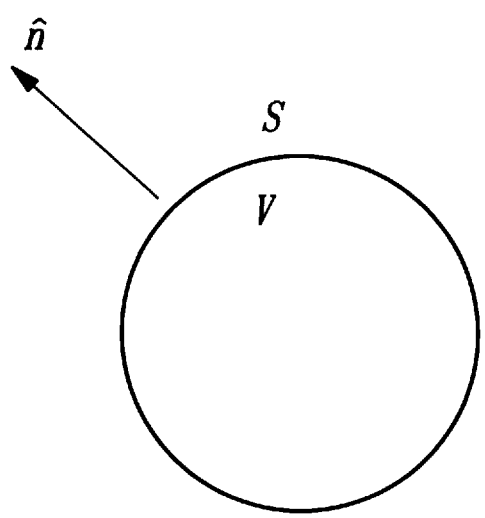
FIG. 9 shows a generalized geometry for diffraction used in the numerical integration method of the present invention.

The numerical integration method of the present invention starts with Maxwell's equations for the fields with an arbitrary structural geometry, as shown in FIG. 9. The fields in each region are solved in terms of the tangential fields at the boundary between the two regions. The tangential fields can also be thought of as surface electric and magnetic currents, which act as sources for the scattered fields in each region. By integrating Maxwell's equations, the fields in each region are expressed with integral operators on the surface currents. The operators include convolution integrals of the surface currents with the free space Green's function. The boundary conditions are continuity of the tangential fields from one region to the other, and this condition is easily enforced with the surface currents. Finally, two coupled integral equations remain, because the unknown fields are set and expressed by the operators and surface currents on the surface.

1. Preliminary Considerations

The following identity is needed for the Fourier transform of the curl of a vector field. The Fourier transform of a vector field, A(r), is $$\Im\{A(r)\} = \tilde{A}(k) = \int\int_{V(r)}\int A(r)e^{-jk\cdot r}dr \qquad \text{Eq. 8}$$

It is implied that the inverse Fourier transform of $\tilde{A}(k)$ returns a valid vector field only over V(r), because the Fourier transform of the vector field is defined only over a volume, V(r). That is, $$\Im^{-1}\{\tilde{A}(k)\} = \left(\frac{1}{2\pi}\right)^3 \int\int_{\text{all }k}\int e^{jk\cdot r}\tilde{A}(k)dk = \qquad \text{Eq. 9}$$

$$\begin{cases} A(r) & r\in V \\ \frac{1}{2}A(r) & r\in S \\ 0 \end{cases}$$

An identity is now formed for the Fourier transform of the curl of a vector by using the vector identity for the curl of a scalar times a vector along with Gauss's theorem. First, $$e^{-jk\cdot r}(\nabla\times A) = \nabla\times(e^{-jk\cdot r}A) - \nabla e^{-jk\cdot r}\times A \qquad \text{Eq. 10}$$

and then integrating and applying Gauss's theorem, the result is:

$$\Im(\nabla\times A(r)) = \int_{S(r)}\int \hat{n}\times e^{-jk\cdot r}A(r)dr + jk\times\tilde{A}(k) \qquad \text{Eq. 11}$$

where $\hat{n}$ is the unit normal vector on S pointing away from V.

2. Starting with Maxwell's Equations

The method starts with Maxwell's equations for time-harmonic ($e^{-j\omega t}$ dependence) fields in a linear, isotropic, homogeneous, and source-free medium. The method then moves to the Fourier domain and solves for the fields in all space in terms of the tangential fields at the surface of the structure. The inverse Fourier transform is taken at the end, using the convolution theorem. The result will be two coupled equations for the electric and magnetic fields in terms of integrals of the Green's function with the surface currents. The surface currents will act as sources, so that once these currents are known, the fields at any point in space can be calculated by integrating over the sources with the appropriate Green's function. Diffraction would not only occur on the surface, but also inside the volume, if the medium inside the volume were inhomogeneous. Volume source currents as well as the surface currents are required in such a case.

The interface between two homogeneous media is then considered. For example, an optical disc memory consists of pits in an aluminum coated disc with a polycarbonate covering. Aluminum is highly conductive even though the aluminum covering is thin, so that the fields will not penetrate very deeply. Thus, a volume filled with aluminum can be used in the calculation instead of having to consider the more difficult problem of a thin aluminum coating on polycarbonate. The incident medium in this example is the polycarbonate. There is no need to consider the volume source currents, because both the aluminum and polycarbonate are homogeneous. The formulation of the present invention will only use the surface currents.

A complex $\epsilon$ is used, as a convention, to account for induced current in the medium. If $\epsilon=\epsilon'+j\epsilon''$, then $-j\omega\epsilon'E+J = (-j\omega\epsilon'+\sigma)E = -j\omega\epsilon E$, with $\sigma=\omega\epsilon''$. Taking the Fourier transform of Maxwell's equations, $$\nabla\times E = j\omega\mu H \qquad \text{Eq. 12a}$$

$$\nabla\times H = -j\omega\epsilon E \qquad \text{Eq. 12b}$$

and using Eq. 11, we obtain:

$$\Im(\nabla\times E) = \int_{S(r)}\int \hat{n}\times E(r_s)e^{-jk\cdot r_s}dr_s + jk\times\tilde{E}(k) = j\omega\mu\tilde{H}(k) \qquad \text{Eq. 13a}$$

$$\Im(\nabla\times H) = \int_{S(r)}\int \hat{n}\times H(r_s)e^{-jk\cdot r_s}dr_s + jk\times\tilde{H}(k) = -j\omega\epsilon\tilde{E}(k) \qquad \text{Eq. 13b}$$

The term $r_s$ has been used to indicate the independent variable along the surface of the volume. The vector fields $\hat{n}\times E(r_s)$ and $\hat{n}\times H(r_s)$ are equal to the tangential components of $E(r_s)$ and $H(r_s)$, respectively, at the surface, except that they point tangentially to the surface and perpendicularly to $E(r_s)$ and $H(r_s)$. These tangential components can be thought of as surface currents, and the boundary conditions require continuity of these surface currents. These surface currents are defined, as a convenience, as:

$$J_{s,m}(r_s) = \hat{n}\times E(r_s) \qquad \text{Eq. 14a}$$

$$J_{s,e}(r_s) = -\hat{n}\times H(r_s) \qquad \text{Eq. 14b}$$

The terms with surface integrals in Eqs. 13a and 13b can now be written as Fourier transforms of the surface currents. Substituting the definitions into Eqs. 13a and 13b, the following coupled equations are obtained:

$$\tilde{J}_{s,m}(k) = j\omega\mu\tilde{H}(k) - jk\times\tilde{E}(k) \qquad \text{Eq. 15a}$$

$$-\tilde{J}_{s,e}(k) = -j\omega\epsilon\tilde{E}(k) - jk\times\tilde{H}(k) \qquad \text{Eq. 15b}$$

The next step is to solve Eqs. 15a and 15b for $\tilde{E}$ and $\tilde{H}$ in terms of $J_{s,m}$ and $J_{s,e}$. Consider $J_{s,m}$ and $J_{s,e}$ as known. Then, Eqs. 15a and 15b form two equations with two unknowns. An equation can be written for $\tilde{E}(\tilde{H})$ by substituting Eq. 15a into Eq. 15b to eliminate $\tilde{H}$ (or, alternatively, Eq. 15b into Eq. 15a to eliminate $\tilde{E}$). Using the vector identity $jk\times jk\times A = |k|^2 A + jk(jk\cdot A)$ and the two additional relations, $$jk\cdot\tilde{H} = (j\omega\mu)^{-1}jk\cdot\tilde{J}_{s,m} \qquad \text{Eq. 16a}$$

$$jk\cdot\tilde{E} = (j\omega\epsilon)^{-1}jk\cdot\tilde{J}_{s,e} \qquad \text{Eq. 16b}$$

formed by taking jk·Eqs. 15a and 15b, expressions are obtained for $\tilde{E}(\tilde{E})$. The resulting equations are:

$$\tilde{E}(k) = [|k|^2 - k^2]^{-1}\left[j\omega\mu\left(1 + \frac{jk(jk\cdot)}{k^2}\right)\tilde{J}_{s,e}(k) - jk\times\tilde{J}_{s,m}(k)\right] \qquad \text{Eq. 17a}$$

$$\tilde{H}(k) = [|k|^2 - k^2]^{-1}\left[j\omega\epsilon\left(1 + \frac{jk(jk\cdot)}{k^2}\right)\tilde{J}_{s,m}(k) + jk\times\tilde{J}_{s,e}(k)\right] \qquad \text{Eq. 17b}$$

In the above expressions, the notation $k^2 = \omega^2\mu\epsilon$, which is a constant inside the volume, is substituted. This constant is not to be confused with $|k|^2$, which is the squared magnitude of the independent variable in Fourier space.

The final step is to take the inverse Fourier transforms of Eqs. 17a and 17b, making use of the convolution theorem. The inverse Fourier transform of the first term in each of Eqs. 17 is the Green's function for free space propagation:

$$\mathfrak{F}^{-1}\{[|k|^2 - k^2]^{-1}\} = G(r, r') = \frac{e^{jk|r-r'|}}{4\pi|r-r'|} \qquad \text{Eq. 18}$$

where, as a convention, Im{k}>0 is chosen. The convolution operator is notated, for convenience, as:

$$G(r, r_s) * A(r_s) = \int_{S(r)} \int G(r; r_s) A(r_s) dr_s \qquad \text{Eq. 19}$$

The inverse Fourier transforms can now be performed on Eqs. 17 to obtain our desired result for the fields in terms of the surface currents. Using the Fourier transform identities, $$\mathfrak{F}^{-1}\{jk(jk \cdot \tilde{A}(k))\} = \nabla(\nabla \cdot A(r)) \qquad \text{Eq. 20}$$

and $$\mathfrak{F}^{-1}\{jk \times \tilde{A}(k)\} = \nabla A(r) \qquad \text{Eq. 21}$$

the inverse Fourier transform of Eqs. 17 are $$-\nabla \times (G(r; r_s) * J_{s,m}(r_s)) + \qquad \text{Eq. 22a}$$

$$j\omega\mu \left(1 + \frac{\nabla(\nabla \cdot)}{k^2}\right)(G(r; r_s) * J_{s,e}(r_s)) = \begin{cases} E(r) & r \in V \\ \frac{1}{2} E(r) & r \in S \\ 0 \end{cases}$$

$$j\omega\epsilon \left(1 + \frac{\nabla(\nabla \cdot)}{k^2}\right)(G(r; r_s) * J_{s,m}(r_s)) + \nabla \times \qquad \text{Eq. 22b}$$

$$(G(r; r_s) * J_{s,e}(r_s)) = \begin{cases} H(r) & r \in V \\ \frac{1}{2} H(r) & r \in S \\ 0 \end{cases}$$

The derivatives inside the convolution integrals cannot, in general, be moved in forming Eqs. 22a and 22b, because of the singularity of the Green's function. In fact, the singularity will only be of concern when r∈S.

3. Matching Boundary Conditions

The diffraction problem is for a boundary between two optically different, homogeneous media. FIG. 10 shows a geometry consisting of two volumes, $V_0$ and $V_1$. Note that the sources of the incident field are placed in $V_0$. A source free region was assumed in the initial statement of Maxwell's equations. Therefore, expressions can only be written for fields that are source-free in a particular region. Following de Hoop (cited above), the fields summarized in the following table will be used in this description:

TABLE 1

The Fields and Their Source-Free Regions

| Field | description | source free in |
|---|---|---|
| $F_1$ | total field in $V_1$ | $V_1$ |
| $F_0$ | total field in $V_0$ | |
| $F_i$ | incident field | $V_1$ |
| $F_s$ | scattered field | $V_0$ |

An expression is written for each field in the region where the field is source-free. The boundary conditions require equality of the tangential components of the total fields in each region, $F_0$ and $F_1$, at the surface. Note, however, that $F_0$ is not source free in any region. $F_0$ can be decomposed into its incident, $F_i$, and scattered, $F_s$, parts. Each of these components has a source free region. The final result, after equating the tangential components of $F_0$ and $F_1$ at the surface, is a set of coupled integral equations for the unknown surface currents.

Eqs. 22 express the fields inside a volume in terms of operators on the tangential fields at a surface. The notation can be simplified significantly by using operators. Thus, $\overline{\Gamma}$ is the operator matrix, J is the vector of surface currents, and F is the vector of fields. Then, $$\overline{\Gamma} = \qquad \text{Eq. 23}$$

$$\begin{bmatrix} -\nabla \times (G(r; r_s) * & j\omega\mu\left(1 + \frac{\nabla^2}{k^2}\right)(G(r; r_s) * \\ j\omega\epsilon\left(1 + \frac{\nabla^2}{k^2}\right)(G(r; r_s) * & \nabla \times (G(r; r_s) * \end{bmatrix}$$

$$J(r_s) = \begin{bmatrix} J_{s,m}(r_s) \\ J_{s,e}(r_s) \end{bmatrix}, \qquad \text{Eq. 24}$$

$$F(r) = \begin{bmatrix} E(r) \\ H(r) \end{bmatrix}, \qquad \text{Eq. 25}$$

and Eqs. 22 become:

$$\overline{\Gamma}(r; r_s) J(r_s) = \begin{cases} F(r) & r \in V \\ \frac{1}{2} F(r) & r \in S \\ 0 \end{cases} \qquad \text{Eq. 26}$$

In region 0, $k_0 = \omega\sqrt{\mu_0\epsilon_0}$, $G_0(r;r_s) = (1/4\pi|r-r_s|)e^{jk_{(0)}|r-r_s|}$, and $\overline{\Gamma}^{(0)}$ is the corresponding operator. Similarly, $\overline{\Gamma}^{(1)}$ is the operator for region A convenient formula is now obtained with which to express the fields in each region in terms of the tangential fields on the surface of the diffracting structure. Solving first for the fields in $V^1$, Eq. 26 is applied, providing the following result:

$$\overline{\Gamma}^{(1)}(r; r_s) J(r_s) = \begin{cases} F_1(r) & r \in V_1 \\ \frac{1}{2} F_1(r) & r \in S \\ 0 & r \in V_0. \end{cases} \qquad \text{Eq. 27}$$

The fields in region 0 can be separated into an incident field and a scattered field, $F_0(r) = F_s(r) + F_i(r)$. The incident field, by definition, has its sources somewhere in $V_0$, and it is the field that would be present if the medium in region 1 were optically identical to the medium in region 0. The sources for the scattered field are the surface currents on S. The form of Maxwell's equations for a source-free region was chosen in the formulation for the solution of the fields in a region (resulting in Eq. 26). Therefore, care must be taken as to how that formula is applied to the incident and scattered fields. The formula can be solved in the incident and scattered fields with the following equation, because the scattered field is source-free in $V_0$:

$$-\overline{\Gamma}^{(0)}(r; r_s)J_s(r_s) = \begin{cases} F_s(r) & r \epsilon V_0 \\ \frac{1}{2} F_s(r) & r \epsilon S \\ 0 & r \epsilon V_1 \end{cases} \quad \text{Eq. 28}$$

The minus sign for the operator in the above formula indicates retention of the convention that the surface normal points into $V_0$. The incident field, however, is not source-free in $V_0$. Thus, an expression cannot be directly written for the incident field in $V_0$. Instead, the incident field is expressed in $V_1$, $$\overline{\Gamma}^{(0)}(r; r_s)J_i(r_s) = \begin{cases} F_i(r) & r \epsilon V_1 \\ \frac{1}{2} F_i(r) & r \epsilon S \\ 0 & r \epsilon V_0 \end{cases} \quad \text{Eq. 29}$$

The operator $\overline{\Gamma}^{(0)}$ can be used for the incident field in $V_1$, because the incident field was defined as the field that would be present in $V_1$ if this medium had no optical contrast with the medium in $V_0$. Subtracting Eq. 29 from Eq. 28, and substituting $F_0 = F_i + F_s$, the following relation is obtained:

$$-\overline{\Gamma}^{(0)}(r; r_s)J(r_s) = \begin{cases} F_s(r) & r \epsilon V_0 \\ \frac{1}{2} F_0(r) - F_i(r) & r \epsilon S \\ -F_i(r) & r \epsilon V_1 \end{cases} \quad \text{Eq. 30}$$

Eqs. 22 and 30 constitute a number of equations equal to four times the number of unknowns. Wirgin, "Optics Communications," Vol. 27, No. 2, 1978, at 189, and J. Pasman, (cited above), when solving for diffraction from periodic gratings for planewave incidence, use an approach that avoids both explicit integral equations and integrals across singularities. In the third part of each of Eqs. 27 and 30, the right hand sides are known. The fields and surface currents can be expanded into their Fourier components. In addition, a simple matrix equation results for the solution of the coefficients, because the grating of structures is periodic and only one planewave is incident. The last step is to use the coefficients in the forward matrix equation that results from the first parts of Eqs. 27 and 30 to solve for the diffracted planewave coefficients. In addition, this whole process can be performed with either the electric fields or the magnetic fields. Three sampling grids would have to be generated to use this method to solve the problem, where the diffracting surface is not periodic (i.e., has either a plurality of aperiodic structures or has a sinble structure) and the incident field is not a planewave. The three sampling grids are: (1) the surface S, (2) a surface somewhere in $V_1$, and (3) a surface somewhere in $V_0$. Then, basis functions for each grid would have to be chosen.

The approach followed by de A. T. de Hoop, (cited above), and J. G. Dil and B. A. Jacobs, (cited above), and the one that will be follow here, is to concentrate on the fields at the surface for the right hand sides of Eqs. 27 and 30. Selecting the tangential components of those Equations (i.e., multiplying those equations by n̂hatx), Fredholm integral equations of the first kind appear. The four integral equations, along with the boundary condition, need to be combined to form two equations with two unknowns, $$\begin{bmatrix} J_{s,m} \\ J_{s,e} \end{bmatrix}$$

and known right hand sides $$\begin{bmatrix} J_{s,m}^{(i)} \\ J_{s,e}^{(i)} \end{bmatrix}.$$

The boundary condition, equality of the tangential components on the surface, are written as $\hat{n} \times F_0 = \hat{n} \times F_1 = J$.

One solution is to select the tangential components of Eqs. 27 and 30 and then add the two equations together (using $\Gamma = \hat{n} \times \overline{\Gamma}$:

$$(\Gamma^{(1)} - \Gamma^{(0)})J = \frac{1}{2}J_1 + \frac{1}{2}J_0 - J^{(i)} \quad \text{Eq. 31}$$

Setting $J_1 = J_0 = J$ (the boundary condition), the final coupled integral equations are obtained:

$$(\Gamma^{(1)} - \Gamma^{(0)} - 1)J = -J^{(i)} \quad \text{Eq. 32}$$

for the unknown surface currents, J.

4. Numerical Solution of the Integral Equations

The integrals of Eq. 32 are numerically solved by first approximating the surface currents with basis function expansions. As a result, each of the unknown surface currents in Eq. 32 becomes a vector of coefficients. The vector of basis functions is placed with the operators, so that each of the four operators in Eq. 32 becomes a row vector of operators, where each element includes a convolution of the Green's function and a basis function. The expansion itself introduces no error if a basis function is chosen so that the expansion converges uniformly to the surface current. The expansion must be truncated, so that the numerical program can work with finite vectors. This truncation, however, introduces error.

The integrals in the operator matrix cannot be numerically evaluated until values for r are chosen. Choosing a value of rvec corresponds to choosing a point on the surface where fields should be calculated with the operator matrix. Values of r are chosen by representing the surface as a set of grid points. Weighting functions on the surface could be chosen and the fields calculated according to those weighting functions, in the most general approach, rather than calculating the fields at specific grid points on the surface. Weighting functions made up of a set of evenly spaced delta functions is equivalent to choosing a set of grid points on the surface and calculating the fields at these grid points. Solving the fields only at a fixed set of grid points does not introduce error, except that the incident field on the right hand side of the equation must also be sampled and truncated according to the weighting functions or grid points. The four operators in Eq. 32 become four matrices, because each operator for each basis function must be numerically calculated for each grid point. Each column of each matrix is for a particular basis function, and each row is for a specific grid point.

The diffracted fields can now be computed. Integral equations were formulated above in a manner independent of geometry and without any assumptions about the fields. A series of choices will now be made, however, that will tailor the numerical calculations to the specific needs of the present invention. The preferred embodiment of the present invention uses tightly focused incident fields and single (or aperiodic) deep diffracting structures with at least one structural parameter on the order of the wavelength of the light source. These structures are assumed to lie in an infinite half plane filled with a medium of complex refractive index $n_1$. The operator matrices will be rewritten after each simplification. Each operator matrix will be handled separately, with the labels $$\Gamma^{(1)} - \Gamma^{(0)} = \begin{bmatrix} \Gamma_{11} & \Gamma_{12} \\ \Gamma_{21} & \Gamma_{22} \end{bmatrix}.$$

a. Two-Dimensional Calculations

The integrals can be immediately performed along the y-axis when the surface and all the fields are independent of a particular direction, say the $\hat{y}$ direction, because only the Green's function has any dependence on y. The Green's function becomes $$G(r, r_s) = G(R) = \int_{-\infty}^{\infty} \frac{e^{jkR}}{4\pi R} dy = \frac{j}{4} H_0^{(1)}(kR) \qquad \text{Eq. 33}$$

which is the Hankel function of the first kind and order zero, and $R=|r-r_s|$. The remaining integration required to calculate each matrix element is a contour integral in the x-z plane.

The independent variable is better described as a scalar, s, because all the integrations are now contour integrations. The scalar, s, is the length along the contour starting from the point on the contour where x=0, which is shown in FIG. 11. The value of s at any point along the contour is calculated in the standard manner, namely, $$s(x) = \int_0^x (ds/dx)(x')dx'$$

The unit vectors $\hat{\tau} \times \hat{n} = \hat{y}$ and $\hat{n}$, which point tangentially and normally, respectively, to the contour, will ease the notation for the formulation in two dimensions. The direction of $\hat{\tau}$ has been chosen, so that $\hat{\tau} \times \hat{n} = \hat{y}$.

Another consequence of the independence in the y-direction is that the problem splits into two independent polarizations: (1) $E=E\hat{y}$(TE) and (2) $H=H\hat{y}$(TM). These polarizations are independent because an incident field with one of these polarizations will scatter only to fields of the same polarization. Assuming, for example, the TE polarization, the magnetic field has the direction $H=H_\tau\hat{\tau} + H_n\hat{n}$, and the surface currents have the following directions:

$$J_{s,m}(s) = \hat{n}(s) \times E(s)\hat{y} = E(s)\hat{\tau}(s) = J_{s,m}(s)\hat{\tau}(s) \qquad \text{Eq. 34a}$$

$$J_{s,e}(s) = -\hat{n}(s) \times (H_\tau(s)\hat{\tau}(s) + H_n(s)\hat{n}(s)) = H_\tau(s)\hat{y} = J_{s,e}(s)\hat{y} \qquad \text{Eq. 34b}$$

The solution fields in Eqs. 22 have directions consistent with the TE field, with the surface currents fixed to these directions and independent of y. Therefore, the integral equations are completely self-consistent with only TE fields present. The principle is the same for the TM polarization.

For the reduction of the integral equations, TE polarization will be assumed. The matrix of operators can be simplified by knowing the specific directions of the surface currents. Specifically, it can be seen that in $\Gamma_{12}$ there is a term, $$\frac{1}{k^2} \nabla(\nabla \cdot (G(r; s) * J_{s,e}(s)\hat{y})) \qquad \text{Eq. 35}$$

The term y must be zero, because the assumption was made that all functions are independent in y. The following equations are obtained by substituting these surface currents into the matrix elements, $$\Gamma_{11}J_{s,m}(r_s) = \hat{n}(s) \times \nabla \times \int_{-\infty}^{\infty} (G_1(R) - G_0(R))J_{s,m}(s')\hat{\tau}(s')ds' \qquad \text{Eq. 36a}$$

$$\Gamma_{12}J_{s,e}(r_s) = j\omega\mu\hat{n}(s) \times \nabla \times \int_{-\infty}^{\infty} (G_1(R) - G_0(R))J_{s,e}(s')\hat{y}ds' \qquad \text{Eq. 36b}$$

$$\Gamma_{21}J_{s,m}(r_s) = \qquad \text{Eq. 36c}$$

$$\frac{\hat{n}(s) \times \nabla \times}{j\omega\mu} \left[ \int_{-\infty}^{\infty} (k_1^2 G_1(R) - k_0^2 G_0(R))J_{s,m}(s')\hat{\tau}(s')ds' + \nabla^2 \cdot \left[ \int_{-\infty}^{\infty} (G_1(R) - G_0(R))J_{s,m}(s')\hat{\tau}(s')ds' \right] \right]$$

$$\Gamma_{22}J_{s,e}(r_s) = -\hat{n}(s) \times \nabla \times \int_{-\infty}^{\infty} (G_1(R) - G_0(R))J_{s,e}(s')\hat{y}ds' \qquad \text{Eq. 36d}$$

where it has been assumed that $\mu=\mu_1=\mu_0$.

b. Choosing the Basis Function

The surface current will now be expanded on a set of basis functions. In general, a function can be represented by the expansion, $$f(x) = \sum_l a_l e_l(x) \qquad \text{Eq. 37}$$

where $e_l(x)$ are the basis functions, and $a_l$ are coefficients. The surface currents can be assumed to be approximately constant over small segments, making the basis functions rect functions (rect(x)=1 when $|x|<\frac{1}{2}$, and 0 otherwise). This approach works well when the incident field has a small angular spectrum, such as a planewave. The number of grid points required to satisfactorily describe the incident field becomes very large, however, when the incident field is a tightly focused spot. This is the case even when the diffracting surface is a flat plane.

The incident field is known to have a large but finite angular spectrum. That the angular spectrum of the incident field is finite is guaranteed by the fact that the incident field comes from far away so that only propagating planewaves can reach the diffracting surface. A good choice of basis functions might then be sinc functions sinc(x)=sin(x)/x. The Nyquist sampling theorem states that a function of finite bandwidth (angular spectrum) is identically equal to a sum of evenly spaced samples weighted by sinc functions, if the sample rate is at least twice the highest frequency (planewave angle) of the function. That is, $f(x)=\Sigma_l f(l\pi/W)$ sinc($\pi Wx-\pi l$), if W is greater than or equal to the bandwidth of f(x). As a result, the incident field and surface currents can be perfectly represented by a set of sinc basis functions if the diffracting surface is a flat plane. The incident field is no longer a simple Fourier transform of its angular spectrum, however, for diffracting surfaces that are not a flat plane.

Moreover, a sampling rate greater than the Nyquist frequency is normally required. This higher sampling rate corresponds to allowing for evanescent waves in other numerical approaches, such as coupled-wave. Intuitively, the sampled rate required for good results would be expected to increase as the surface becomes less like a flat surface. The numerical results from the calculations of the present invention support this rule.

The disadvantage of sinc basis functions is that the integral in each of the matrix elements now has infinite limits. In contrast, the use of rect basis functions places the integral only over the region where the rect is nonzero. Thus, sinc basis functions are superior for flat and nearly flat surfaces. It is not entirely clear, however, which basis function (sinc or rect) is better for deep and narrow grooves in the diffracting surface.

The expansion of the surface currents is of the following form:

$$J_{s,m}(s) = \sum_{l=-N}^{N} a_l \text{sinc}(k_0 W s - \pi l) \qquad \text{Eq. 38a}$$

$$J_{s,e}(s) = \sum_{l=-N}^{N} b_l \text{sinc}(k_0 W s - \pi l) \qquad \text{Eq. 38b}$$

The unaliased bandwidth of the surface currents is determined by W. The coefficients, $a_l$ and $b_l$, are samples of the surface currents at the grid points $s=\pi l/k_0 W$. The expansion has been truncated to $2N+1$ terms. The following Equation is obtained by substituting the basis functions into the matrix elements and placing the coefficients in the vector of unknowns:

$$\Gamma_{11_1} = -\hat{n}(s) \times \nabla \times \int_{-\infty}^{\infty} (G_1(R) - G_0(R)) \text{sinc}(k_0 W s' - \pi l) \hat{\tau}(s') ds' \qquad \text{Eq. 39a}$$

$$\Gamma_{12_1} = j\omega\mu\hat{n}(s) \int_{-\infty}^{\infty} (G_1(R) - G_0(R)) \text{sinc}(k_0 W s' - \pi l) ds' \qquad \text{Eq. 39b}$$

$$\Gamma_{21_1} = \frac{\hat{n}(s) \times}{j\omega\mu} \left[ \int_{-\infty}^{\infty} (k_1^2 G_1(R) - k_0^2 G_0(R)) \text{sinc}(k_0 W s' - \pi l) ds' + \right. \qquad \text{Eq. 39c}$$

$$\left. \nabla^2 \cdot \left[ \int_{-\infty}^{\infty} (G_1(R) - G_0(R)) \text{sinc}(k_0 W s' - \pi l) ds' \right] \hat{\tau}(s') \right]$$

$$\Gamma_{22_1} = \hat{y}(\hat{n}(s) \cdot \nabla) \int_{-\infty}^{\infty} (G_1(R) - G_0(R)) \text{sinc}(k_0 W s' - \pi l) ds' \qquad \text{Eq. 36d}$$

The vector of unknowns is $$J = \begin{bmatrix} a_1 \\ b_1 \end{bmatrix}.$$

c. Handling the Singularities

The derivatives in the matrix elements will now be resolved. The derivatives are with respect to the field point, $r_s$, not the independents variable of integration, s'. As described above, the order of differentiation and integration cannot simply be reversed, because the integration includes the point, s'=s, where the Hankel function has a logarithmic singularity of the nature, $$H_0^{(1)}(kR) \approx j\frac{2}{\pi}\left(\log\left(\frac{kR}{2}\right) + \gamma\right) \text{ as } R \to 0 \qquad \text{Eq. 40}$$

where $\gamma$ is Euler's constant. The singularity cancels because each integrand contains the subtraction, $\Gamma_1(R)-\Gamma_0(R)$, and the integrand has the finite limit:

$$\lim_{R \to 0} [H_0^{(1)}(k_1 R) - H_0^{(1)}(k_0 R)] = j\frac{2}{\pi}(\log(k_1) - \log(k_0)) \qquad \text{Eq. 41}$$

This cancellation does not occur, however, for the first term of $\Gamma_{21_1}$, where $$\lim_{R \to 0} [k_1^2 H_0^{(1)}(k_1 R) - k_0^2 H_0^{(1)}(k_0 R)] = \qquad \text{Eq. 42}$$

$$jk_1^2 \log\left(\frac{k_1 R}{2}\right) - jk_0^2 \log\left(\frac{k_0 R}{2}\right)$$

which has an integrable singularity at R=0. Fortunately, this term does not involve a derivative. The term with the second derivative will have the integrable singularity in the TM case. Thus, the form of the singularity must be subtracted from the integrand before differentiating. (Subtracting singularities will be discussed in the next section.)

To calculate the derivatives, the chain rule is used, which is expressed as follows:

$$\nabla H_0^{(1)}(kR) = -kH_1^{(1)}(kR)(\nabla R) \qquad \text{Eq. 43}$$

$$\nabla R = ((x-x')\hat{x} + (z-z')\hat{z})/R \qquad \text{Eq. 44}$$

The second term of $\Gamma_{21_1}$ has two derivatives. Thus, the nature of the singularity of $kH_1^{(1)}(kR)$ must be examined. Fortunately, the subtraction in the integrand again causes the singularity to cancel:

$$\lim_{R \to 0} [k_1 H_1^{(1)}(k_1 R) - k_0 H_1^{(1)}(k_0 R)] = 0 \qquad \text{Eq. 45}$$

Taking the second derivative of this term will produce a singularity similar to the singularity in the first term of $\Gamma_{21_1}$. (Integrating across these singularities will be discussed in the next section.) The equations for the matrix elements are simplified by introducing the functions, $$H_0(R) = k_1^2 H_0^{(1)}(k_1 R) - k_0^2 H_0^{(1)}(k_0 R) \qquad \text{Eq. 46a}$$

$$H_1(R) = k_1 H_1^{(1)}(k_1 R) - k_0 H_1^{(1)}(k_0 R) \qquad \text{Eq. 46b}$$

$$H_2(R) = k_1^2 H_2^{(1)}(k_1 R) - k_0^2 H_2^{(1)}(k_0 R) \qquad \text{Eq. 46c}$$

Eqs. 39 result in the following by completing the derivatives in those equations:

$$\Gamma_{11_1} = \frac{j}{4} \hat{\tau}(s) \int_{-\infty}^{\infty} H_1(R)(\hat{n}(s') \cdot \nabla R) \text{sinc}(k_0 W s' - \pi l) ds' \qquad \text{Eq. 47a}$$

$$\Gamma_{12_1} = \frac{-\omega\mu}{4} \hat{\tau}(s) \int_{-\infty}^{\infty} H_0^{(1)}(k_1 R) - H_0^{(1)}(k_0 R)) \text{sinc}(k_0 W s' - \pi l) ds' \qquad \text{Eq. 47b}$$

$$\Gamma_{21_1} = \frac{-\hat{y}}{4j\omega\mu} \int_{-\infty}^{\infty} [H_0(R)(\hat{\tau}(s) \cdot \hat{\tau}(s)) - \qquad \text{Eq. 47c}$$

$$\frac{1}{2}(\hat{\tau}(s) \cdot \nabla R)(\hat{\tau}(s') \cdot \nabla R)(H_0(R) - H_2(R))) -$$

$$\hat{\tau}(s) \cdot \nabla(\hat{\tau}(s') \cdot \nabla R) H_1(R)] \text{sinc}(k_0 W s' - \pi l) ds'$$

$$\Gamma_{22_1} = \frac{-j}{4} \hat{y} \Gamma \int_{-\infty}^{\infty} H_1(R)(\hat{n}(s') \cdot \nabla R) \text{sinc}(k_0 W s' - \pi l) ds' \qquad \text{Eq. 47d}$$

All the integrands above can be numerically calculated with the aid of a few additional relations. The following relations are needed for the terms with $\hat{n}(s)$ and $\hat{\tau}(s)$:

$$\hat{n}(s) = \frac{\frac{dz}{dx}\hat{x} - \hat{z}}{ds/dx} \quad \text{Eq. 48}$$

and $$\hat{\tau}(s) = \frac{\hat{x} + \frac{dz}{dx}\hat{z}}{ds/dx} \quad \text{Eq. 49}$$

Also, $$\hat{\tau}(s)\cdot\nabla(\hat{\tau}(s')\cdot\nabla R) = 1/R[\hat{\tau}(s)\cdot\hat{\tau}(s') - (\hat{\tau}(s')\cdot\nabla R)(\hat{\tau}(s)\cdot\nabla R)] \quad \text{Eq. 50}$$

which is easily calculated. If the contour has a region where dz/dx becomes infinite (or large enough that numerical round-off errors will cause problems), then Eqs. 48 and 49 must be replaced in those regions with forms using dx/dz and ds/dz.

Finally, the units of the electric and magnetic fields will be set by choosing $\sqrt{\mu/\epsilon_0}=1$. This choice fixes $\omega\mu=k_0$. Eqs. 44, 46, 47, 48, 49, and 50 now give the completed recipe for calculating the integrands for any pair of s, s' on the contour.

d. Integrating Along the Contour

Each matrix element for each m,l pair can be calculated by choosing as one of the grid points, $s_m=\pi m/k_0$ W, and by numerically integrating the appropriate term from Eq. 47 along the contour. Any of the various numerical quadrature routines would work well in principle. The simplest approach could be to use a standard Gaussian quadrature routine to integrate from grid point to grid point, because the grid points are evenly spaced in s. With this idea, all the grid points, quadrature points, and their x, z, dz, ds, and Hankel function values can be tabulated at the start of the calculation, for example, in lookup tables. The numerical integration cannot be performed to the infinite limits. The integration, however, need not go too far before the error becomes small, because $H_0^{(1)}(kx)\text{sinc}(kx)\alpha(kx)^{-3/2}\sin(kx)e^{jkx}$ as $x\to 0$.

The singularity in the matrix elements $\Gamma_{21\_\{lm\}}$ must now be integrated. These singularities occur only when m=1. Otherwise, $s_m$ falls on a null of the sinc function, and the sinc function goes to zero sufficiently fast to eliminate the singularity. One method to integrate those diagonal terms with the singularity is to subtract the form of the singularity and integrate it separately, as is known. The term becomes:

$$\int_a^b H_0(R)\text{sinc}(k_0Ws' - \pi l)ds' = \int_a^b [H_0(R)\text{sinc}(k_0Ws' - \pi l) - j\frac{2}{\pi}\left(k_1^2\log\left(\frac{k_1|s_l - s'|}{2}\right) - k_0^2\log\left(\frac{k_0|s_l - s'|}{2}\right)\right)]ds' + j\frac{2}{\pi}(b-a)\left(k_1^2\log\left(\frac{k_1(b-a)}{4}\right) - k_0^2\log\left(\frac{k_0(b-a)}{4}\right)\right) - (k_1^2 - k_0^2)) \quad \text{Eq. 51}$$

The subtraction is not necessary outside the interval containing the singularity, a<s'<b. In the formula, $R_l$ indicates that R is calculated from the grid point $s_l$ to s', and $s_l=s_m$ is the grid point for both the basis function and the source point. The TM case is treated slightly differently because a singularity also appears in the term with the double derivative. The correct approach is to subtract the singularity before differentiating, and then differentiating the extra asymptotic terms along with the rest.

e. Incident Field

The right hand side of the general matrix Eq. 32 is the tangential component of the incident field calculated at the grid points $s_m$. Many different models for the incident fields can be used. Restrictions must be placed, however, on the incident field if the numerical problem is to remain practical. As noted above, one source of error is the truncation of the grid points. The truncation is only reasonable if the power flow across the surface at the missing grid points is negligible. Therefore, only incident fields with finite power concentrated over a relatively small region can be allowed. For example, plane waves cannot be handled with this method, but focused spots are permitted.

FIG. 7 shows a lens 708 focusing light onto the diffracting surface 702. A perfect lens transforms the light distribution at its front focal plane into a distribution of plane waves. If B(u) represents the amplitude and phase of the TE electric field at the front focal plane of the lens, where u is the transverse coordinate in this plane, then the incident field behind the lens 708 is:

$$E^{(i)}(x,z) = \hat{y}\int B(u)e^{jk_0(ux+\sqrt{1-u^2}\,z)}du \quad \text{Eq. 52}$$

The incident magnetic field follows from Maxwell's equations, $$H_x^{(i)}(x,z) = \int B(u)\sqrt{1-u^2}\,e^{jk_0(ux+\sqrt{1-u^2}\,z)}du \quad \text{Eq. 53a}$$

$$H_z^{(i)}(x,z) = \int B(u)u\,e^{jk_0(ux+\sqrt{1-u^2}\,z)}du \quad \text{Eq. 53b}$$

The integrals for the incident field are easily calculated numerically, as long as x and z are sufficiently small. The following relationship was used in most of the simulations:

$$B(u) = \begin{cases} 1 & |u| \leq NA \\ 0 & |u| > NA, \end{cases} \quad \text{Eq. 54}$$

where NA corresponds to the numerical aperture of the lens. The incident surface currents for the right hand side of the matrix equation are then $$J_{s,e}^{(i)}(s) = \hat{n} \times E^{(i)} = \hat{\tau}(s)E_y^{(i)}(x_s, z_s) \quad \text{Eq. 55a}$$

$$J_{s,m}^{(i)}(s) = -\hat{n} \times H^{(i)} = \hat{y}(n_x(s)H_z^{(i)}(x_s,z_s) - n_z(s)H_x^{(i)}(x_s,z_s)) \quad \text{Eq. 55b}$$

The incident fields for the TM case are completely analogous: $H_y(x,z)$ is calculated from the front focal plane distribution, and the electric field components are derived from the curl of H.

f. Far Field

The matrix equation is solved using a standard numerical routine, once the matrix elements and the incident field vector are calculated. The solution vector contains the coefficients $a_1$, $b_1$, which can be substituted into Eq. 38 to find the actual surface currents anywhere on the contour. Unfortunately, the tangential fields at the contour cannot be directly measured. Useful results of this diffraction calculation would be the amplitude and phase in the far field, because these quantities can be experimentally measured.

The first part of Eq. 30 is used to calculate the scattered electric field (magnetic field in the TM case). A far field approximation for the Hankel function is used for this calculation. Also, the integrand in Eq. 30 is simplified by ignoring terms that have a dependence on r stronger than $1/\sqrt{|r|}$. The electric far field can then be calculated by a simple numerical integration.

The Hankel function for large arguments will first be examined. That function is as follows:

$$H_n^{(1)}(kR) \approx \sqrt{\frac{2}{\pi kR}} \; e^{jkR} e^{j\frac{\pi}{4}(2n+1)} \quad \text{for } |kR| \gg |n| \qquad \text{Eq. 56}$$

Figure 12:
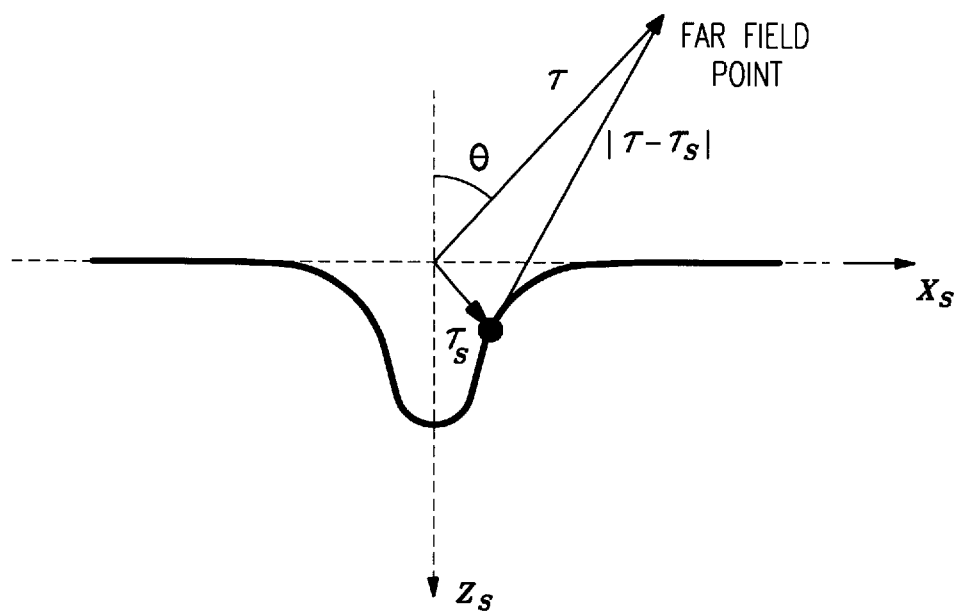
FIG. 12 is a graph showing the coordinate system for the far field.

FIG. 12 shows a coordinate system for the far field calculation. The far field in FIG. 12 is $r \gg r_s$, so that using cylindrical coordinates for r, the following is obtained:

$$R = \sqrt{(r\sin\theta - x_s)^2 + (-r\cos\theta - z_s)^2} \approx r - (x_s\sin\theta - z_s\cos\theta) \qquad \text{Eq. 57}$$

The Green's function for the far field is obtained by substituting this value of R into the asymptotic form of the Hankel function:

$$G_0(r; r_s) = H_0^{(1)}(k_0 R) \approx \sqrt{\frac{2}{\pi k_0 r}} \; e^{j\frac{\pi}{4}} e^{jkr} e^{-jk_0(x_s\sin\theta - z_s\cos\theta)} \qquad \text{Eq. 58}$$

Equation 4.23 for the TE case is:

$$-E(r) = -\nabla \times \int_{-\infty}^{\infty} G_0(r; r_{s'}) J_{s,m}(s') \hat{\tau}(s') ds' + \qquad \text{Eq. 59}$$

$$j\omega\mu_0 \int_{-\infty}^{\infty} G_0(r; r_{s'}) J_{s,e}(s') \hat{y} ds'$$

The integration is not across a singularity, because the field point is now in the far field, and the curl may be resolved directly:

$$-\nabla \times G_0(r; r_{s'}) \hat{\tau}(s') = \hat{y}\hat{n}(s') \cdot \nabla G_0(r; r_{s'}) = \qquad \text{Eq. 60}$$

$$\left( \hat{n}(s') \cdot \frac{r}{|r|} \right) jk_0 G_0(r; r_{s'})$$

where terms with $r^{-3/2}$ dependency have been ignored. The electric far field is determined by making the appropriate substitutions and ignoring the $e^{jk_0 r}/\sqrt{r}$ factor:

$$-E(\theta) = \hat{y}\sqrt{\frac{2k_0}{\pi}} \; e^{j\frac{\pi}{4}} \int_{-\infty}^{\infty} [(n_x(s')\sin\theta - \qquad \text{Eq. 61}$$

$$n_z(s')\cos\theta) J_{s,m}(s') + J_{s,e}(s')] \; e^{-jk_0(x(s')\sin\theta - z(s')\cos\theta)} ds'$$

The integration in Eq. 61 is easily performed numerically because all the grid points and surface currents have already been tabulated. Values for $\theta$ can be chosen arbitrarily, although values that lie within the objective lens are generally used. The far field intensity is proportional to the magnitude squared of the electric field.

C. Methods for Testing the Results of the Numerical Integration Method

Several methods are known in the art for testing whether the numerical integration method is both numerically stable and an accurate representation of the mathematical formulation. These testing methods include comparing numerical results against analytic solutions for the small class of known solutions, checking that the numerical solution satisfies the appropriate power conservation laws, testing reciprocity relations with the numerical method, testing the numerical results with the extinction cross-section theorem, and checking the convergence of the numerical results for decreasing grid spacing and increasing matrix rank.

Different checks are useful at different stages of forming the numerical integration method. For the problem of a planar interface, a problem for which analytic solutions are known, only the matrix elements of $\Gamma_{12}$ and $\Gamma_{21}$ are nonzero. The planar interface problem can then be used to scrutinize the calculation of the matrix elements $\Gamma_{21}$. These elements are the most complicated calculations and, therefore, the most likely to contain errors. Power conservation relations are useful when assembling the various components of the overall calculation. For example, power conservation would not follow if a sign error were present in one of the incident fields. These two tests (i.e., the planar interface problem and power conservation relations) ensure that the numerical integration method is an error-free representation of the formulated equations. These two tests do not, however, in general, test the numerical stability and accuracy of the computer program.

Convergence testing is the best method to evaluate the numerical stability of the numerical integration method of the present invention. The convergence test involves simply performing the method repeatedly for the same problem with an increasing number of grid points. (As described above, the numerical integration method is preferably embodied in a computer program, which can be run repeatedly with an increasing number of grid points for convergence testing.) The numerical program is stable if the numerical solution converges in a reasonable manner, at least for the particular problem that was computed. The numerical accuracy of the solution can be estimated from the convergence data.

Another testing method that will be discussed is a new check specifically for the parameter W, the scale of the sinc functions, and, thus, the inverse of the grid spacing. This method uses the Fast Fourier Transform (FFT) of the surface currents to check the validity of the assumption that they are bandlimited to W.

1. Power Flow Test

The power conservation rule is simply that the time averaged power flow transmitted across the contour boundary plus the power reflected from the boundary is equal to the power in the incident field. This method can only use incident fields with finite power, unlike formulations that use a plane wave as the incident field. First, it will be shown that the power flow across a boundary can be calculated with the surface currents. Second, the formulas for calculating the transmitted, reflected, and incident power from the surface current coefficients will be derived. This is done by applying the finite power incident field formulation and the orthogonality of the sinc functions.

The time averaged electromagnetic power flow across a surface is found by integrating the normal component of the real part of the Poynting vector, as is known:

$$<P> = \int_{-\infty}^{\infty} Re\{E \times H^*\} \cdot \hat{n} ds \qquad \text{Eq. 62}$$

The integration in the $\hat{y}$ direction is ignored, because the problem has been formulated in two dimensions. The normal component of the Poynting vector, however, can be represented using surface currents. The following relation is obtained from the definition of the surface currents:

$$J_{s,m} \times J^*_{s,e} = (-\hat{n})[\hat{n} \cdot (E \times H^*)] \qquad \text{Eq. 63}$$

The directions of the surface current vectors are already known from the two dimensional treatment. For TE:

$$J_{s,m}\hat{\tau} \times J^*_{s,e}\hat{y} = -J_{s,m}J^*_{s,e}\hat{n} \qquad \text{Eq. 64}$$

and the time averaged power flow across the surface is $$<P> = \int_{-\infty}^{\infty} Re\{J_{s,m}(s)J^*_{s,e}(s)\}ds \qquad \text{Eq. 65}$$

Note that the sign of the integrand has been changed so that the power flow is from $V_0$ into $V_1$, opposite the direction of $\hat{n}$.

The power flow in terms of the surface coefficients is obtained by substituting the basis function expansions of the surface currents, Eqs. 38, into the expression for the average power of Eq. 65:

$$<P> = \frac{\pi}{2W} \sum_l Re\{a_l b_l^*\} \qquad \text{Eq. 66}$$

This last formula results from the orthogonality relation, $$\int_{-\infty}^{\infty} \text{sinc}(k_0 W s' - \pi l) \text{sinc}(k_0 W s' - \pi l')ds' = \frac{\pi}{2W}\delta_{ll'} \qquad \text{Eq. 67}$$

where l and l' are integers and $\delta_{ll'}=1 \Leftrightarrow l=l'$.

The power calculated in Eq. 66 gives the total power flow across the boundary, which is the transmitted power. To test the power conservation relation, $$<P> = <P^{(i)}> - <P^{(r)}> \qquad \text{Eq. 68}$$

The incident power, $<P^{(i)}>$, and reflected power, $<P^{(r)}>$, must be calculated. The incident power is simply the power flow across the boundary for the case where no optical contrast exists between the two regions. In that case, $a_l = a_l^{(i)}$ and $b_l = b_l^{(i)}$. Substitution of these coefficients, already calculated as the right hand side of the matrix equation, into Eq. 66 gives $<P^{(i)}>$.

The tangential fields must first be separated into incident and scattered fields in order to calculate the reflected power. The total fields in $V_0$, as stated in the formulation of the integral equations, can be separated into the incident fields and the reflected scattered fields. The boundary condition ensures that the surface currents are representations at the boundary of the tangential fields of $V_0$ as well as $V_1$. Therefore, the surface currents can also be separated into incident and reflected components:

$$J_{s,m}(s) = J_{s,m}^{(i)}(s) + J_{s,m}^{(r)}(s) \quad J_{s,e}(s) = J_{s,e}^{(i)}(s) + J_{s,e}^{(r)}(s) \qquad \text{Eq. 69}$$

The orthogonality of the basis functions gives the following equation when the surface currents for the reflected fields are expanded on the same sinc basis set:

$$a_l^{(r)} = a_l - a_l^{(i)} \quad b_l^{(r)} = b_l - b_l^{(i)} \qquad \text{Eq. 70}$$

The reflected power can now be calculated using the coefficients $a_l^{(r)}$ and $b_l^{(r)}$ in Equation 4.59.

2. The Convergence Test

Convergence of the numerical results means that, if a calculation is repeated several times with smaller grid spacing each time, then the numerical results will become more accurate with each repetition. Here, the convergence should be tested for both decreasing grid spacing (increasing W) and increasing number of grid points with a fixed grid spacing. The latter test is employed because this invention is applied to individual or aperiodic structures, rather than periodic structures (e.g., gratings), and the integral is approximated to infinity by integrating only as far as the grid points extend.

Convergence testing is important and is preferably performed before accurate results can be obtained. There is a trade-off between accuracy and computation time in every numerical calculation. A grid spacing can be chosen that gives satisfactory accuracy for a reasonable computation time, by considering the convergence properties. Naturally, the convergence estimation itself will require relatively long computation time because the test should extend to grid spacing smaller than required. Also, the test should be carried to grid spacings small enough to determine if the results are oscillating or converging uniformly. Finally, the numerical results for the surface currents and the far field will converge at different rates for different contour points or far field angles, depending on the particular contour.

3. Testing by Checking the Sample Rate with the FFT

The choice of sinc functions for the basis functions of the surface current allows for another type of convergence check. As described above, expanding a function on a basis set of sinc functions makes the implicit assumption that the function is strictly bandlimited. Also, the coefficients, $a_l$, $b_l$, are samples of the surface currents at the points $s=\pi l/k_0 W$.

The Fourier transforms of the surface currents can be calculated based on exactly knowing the functions everywhere. The Fourier transforms should show a cutoff frequency, if the surface currents are in fact bandlimited. The highest frequency bin will correspond to the cutoff frequency of the bandlimited functions, if the FFTs of the surface current coefficients are calculated. Therefore, one can reasonably assume that aliasing is occurring and that the grid spacing should be shortened (i.e., that the bandwidth, W, should be increased), if the FFTs of the surface current coefficients have significant amplitudes in the high frequency bins.

4. Testing Example: Single Groove in Silicon with TE Illumination

This example simulates measurement of the depth of a groove etched in silicon. Semiconductor fabrication can involve etching single pits and grooves into a substrate, usually silicon, where the lateral dimension is as small as a quarter micron and the depth is one micron or more. Conceivably, a useful quality control measurement would be to measure the diffraction of a spot of laser light focused onto the silicon groove or pit. The measured diffraction could then be compared to a "perfect" example and a quality determination made. The sensitivity of this type of measurement could be numerically estimated by calculating the changes in diffraction patterns for grooves with varying parameters.

Figure 13:
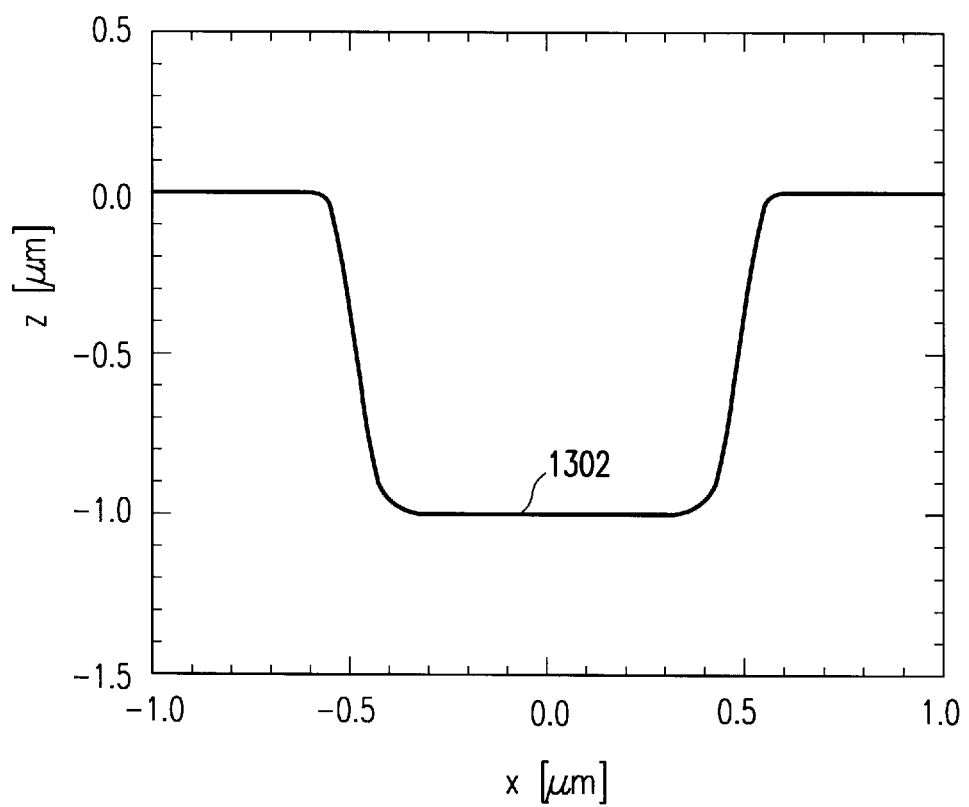
FIG. 13 is a graph showing a groove contour of a super-gaussian profile of the form $z(x)=a \exp(-x/\sigma)^\upsilon$, where $a=1$, $\sigma=0.5$, and $\upsilon=14$.

A single groove 1 micron deep and 1 micron wide was selected for this example to illustrate the convergence properties of the numerical integration method. An objective lens with a numerical aperture of 0.6 focuses light onto the groove and captures the reflected far field with the same aperture. The wavelength of the light is 0.6328 micron. The index of refraction of silicon at this wavelength is approximately 3.88+j0.02. The numerical integration method of the present invention does have a requirement that the boundary have a continuous first derivative. Therefore, a rectangular groove with sharp corners cannot be used. In consequence, a super-gaussian profile is used. The super-Gaussian profile is of the form, $z(x)=a\exp(-(x/\sigma)^\upsilon)$. FIG. 13 shows the groove shape 1302, in which the contour was truncated at $s=\pm 4$ micron for these calculations. The groove contour 1302 is for $a=1$, $\sigma=0.5$, and $\upsilon=14$.

TABLE 2 below shows the convergence for the reflected, transmitted, and total power for an increasing number of grid points.

TABLE 2

POWER CONSERVATION TEST FOR THE INTEGRAL METHOD CONVERGES FOR A SINGLE GROOVE IN SILICON

| # of Grid Points | R | T | R + T |
|---|---|---|---|
| 83 | −3.171 | 4.1515 | 0.9802 |
| 99 | 0.2984 | 0.7019 | 1.0002 |
| 115 | 0.3006 | 0.6996 | 1.0002 |
| 131 | 0.2998 | 0.6993 | 0.9991 |
| 147 | 0.3000 | 0.6994 | 0.9994 |
| 165 | 0.3005 | 0.6991 | 0.9997 |

The reflected and transmitted power values for the calculation with 83 grid points are both nonphysical, but the sum is actually close to one. Also, R and T oscillate as they converge when more grid points are used.

Figure 14:
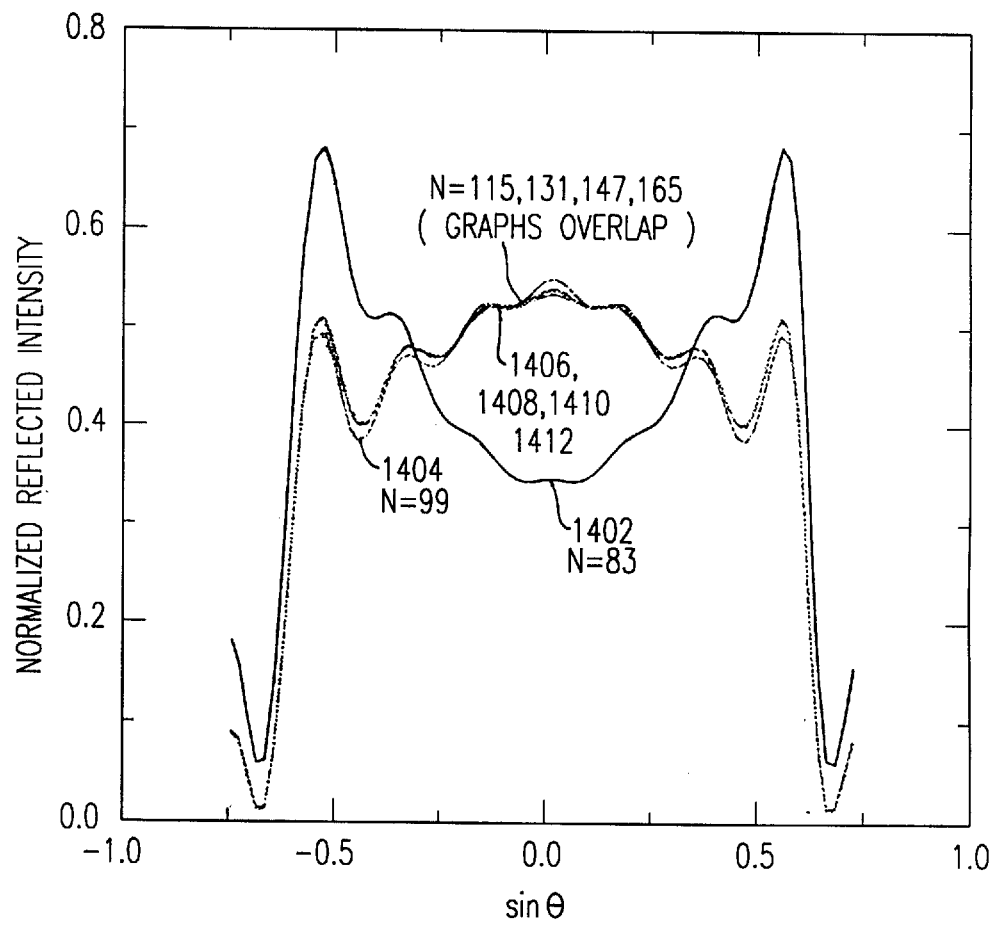
FIG. 14 is a plot of the successive change to the far field calculation as the solution for the numerical integration method converges.

FIG. 14 shows a plot of the successive change to the far field calculation as the numerical solution converges, as an absolute limitation to the value of using the numerical integration method to predict the far field intensity. Plot 1402, which is very different from the other plots 1404, 1406, 1408, 1410, 1412 is for the trial with 83 grid points (i.e., the curve N=83 in FIG. 14). The other far field plots (i.e., N=99, 115, 131, 147, 165) converge, but not uniformly for all the points. Notice the strong oscillation of the far field as $\sin(\theta)$ approaches the numerical aperture of 0.6. These oscillations are similar to the Gibbs phenomenon for truncated Fourier transforms. They appear here because of the similarity between the far field calculation (Equation 4.54) and a Fourier transform. Also, the integration for the far field calculation is truncated as the contour is truncated. The Gibbs phenomenon oscillations can be reduced by weighting the contour integration for the far field calculation with an appropriate window function.

Figure 15:
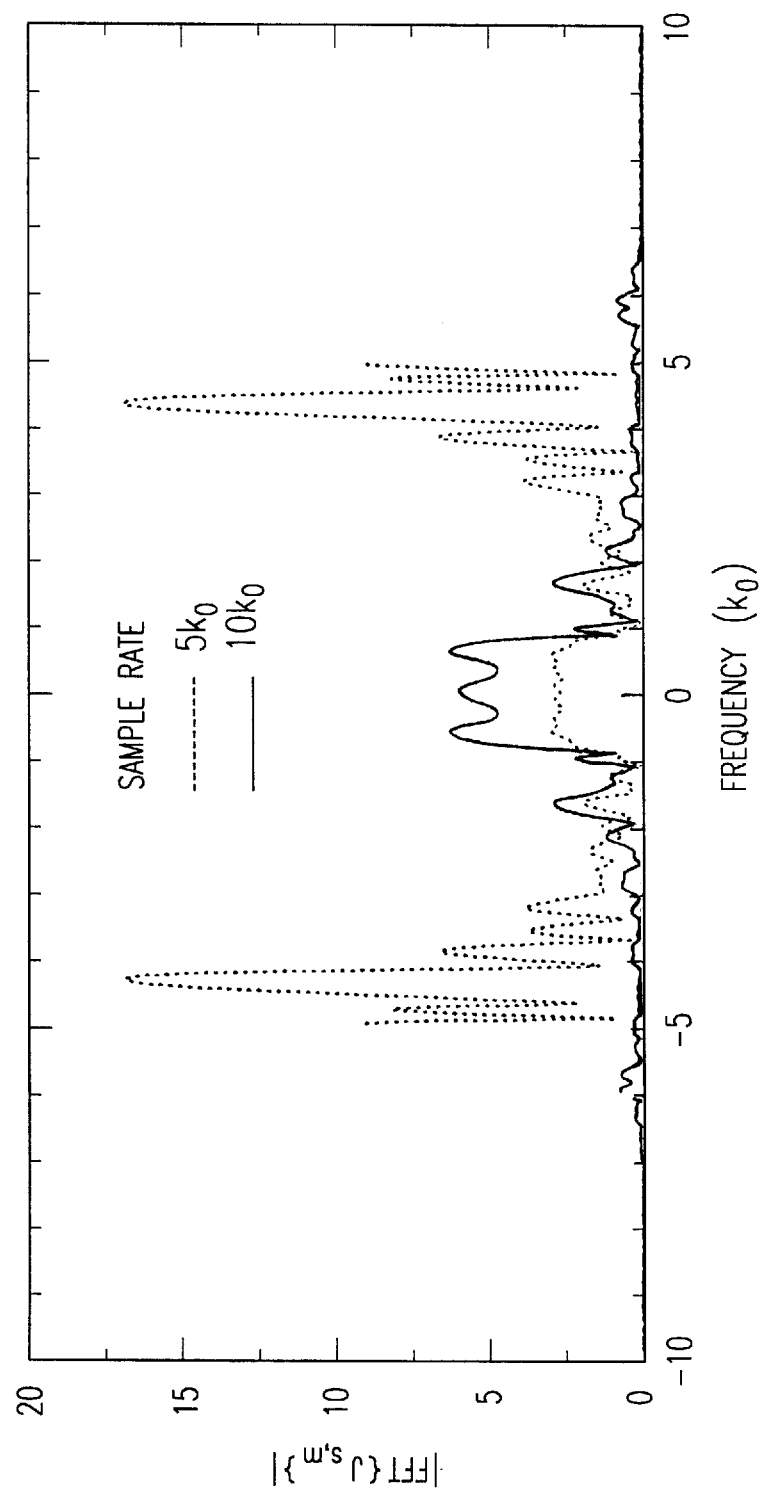
FIG. 15 is a plot showing the amplitude of the Fast Fourier Transform of $J_{s,m}$ for two different grid spacings.

The final check is the FFT of the surface currents. FIG. 15 shows the amplitude of the FFT of $J_{s,m}$ for two different values of the grid spacing, W. A sample rate of W=5 corresponds to 83 grid points, and W=10 corresponds to 165 grid points. The highest contour spatial frequency for the first case is $5k_0$, and the FFT shows large amplitudes there. Therefore, the surface currents are highly aliased with this sample rate. The amplitude of the FFT goes to zero, however, for the greater sample rate of $10k_0$ at the higher contour spatial frequencies. The result of aliasing brings energy that should be at higher frequencies into the lower contour spatial frequencies, distorting the calculated surface currents. This principle explains why the far field calculation for 83 grid points was significantly different in shape from the others.

D. Experimental Verification of the Numerical Integration Method

Figure 16:
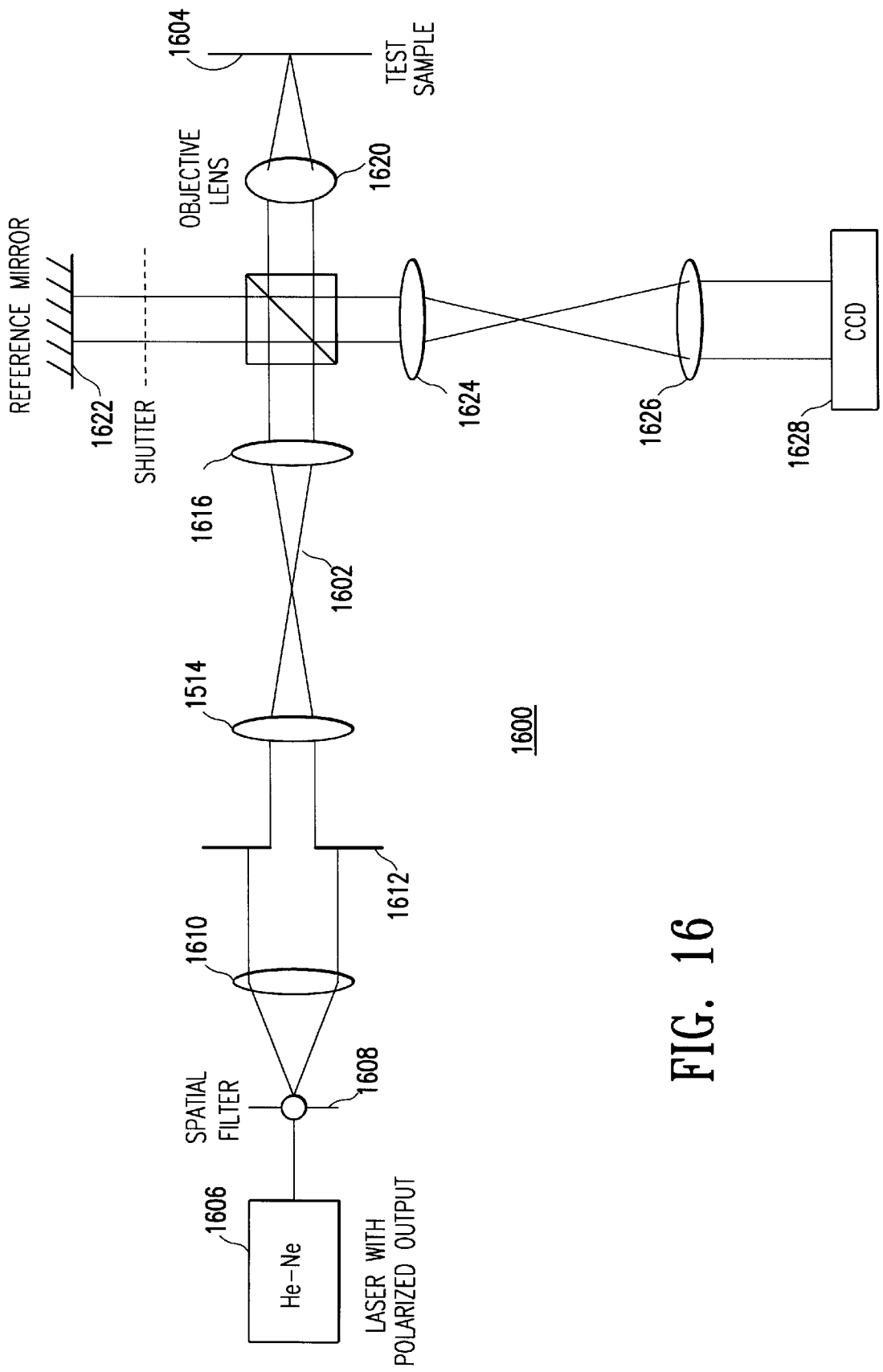
FIG. 16 shows an apparatus used in experiments for measurement of the diffracted far field for focused incident fields.

The diffracted far field for each sample was measured in a similar manner to a Fourier plane measurements, as is known. FIG. 16 shows an detector apparatus 1600 used in a laboratory setup to measure the diffracted far field for focused incident fields. The detector apparatus 1600 includes an He—Ne laser 1606 with polarized output, a spatial filter 1608, a first collimating lens 1610, an iris 1612, a first focusing lens 1614, a second collimating lens 1616, a beam splitter 1618, and an objective lens 1620. These elements are used to direct the light beam 1602 onto the test sample structure 1604. The detector apparatus 1600 also includes a reference mirror 1622, a second focusing lens 1624, a third collimating lens 1626, and a CCD camera 1628 to detect the reflected light beam 1602.

The iris 1612 is imaged onto the entrance pupil of the objective lens 1620, reducing the numerical aperture of the incident field. The full numerical aperture of the objective lens 1620 is used to capture the reflected field. The back focal plane, or Fourier plane, of the objective lens 1620 is imaged by lens 1624 and lens 1626 onto the CCD camera 1628, where an intensity profile of the reflected light is measured. The reference mirror 1622 is used to focus the illumination spot, and a shutter is closed when diffraction measurements are recorded.

The measurement of the far field is for a three dimensional spot, but the numerical calculation is only for two dimensions. A true comparison would be for the incident illumination being formed by a cylindrical lens rather than the spherical objective lens 1620 that is used. A cross-section of the measured far field is used, and the effect of the spot profile in the other direction is ignored. It can be argued that, if the test pattern is truly independent of one direction, no plane wave with an angle in that dimension can be diffracted to its angle in that dimension. Therefore, a cross section in the direction of interest should contain no diffraction of plane waves that would not be present if the objective lens 1620 were a cylinder.

1. Aluminum Grating with TM Incidence

The first test sample consisted of sinusoidal gratings in Aluminum. The gratings were fabricated by the Rochester Photonics Corporation (Rochester, N.Y.) using a rastered laser spot to expose a photoresist. A coating of approximately 500 Angstroms of aluminum was evaporated onto the grating after the photoresist was developed to form the grating. Finally, the actual depth and profile of the grating was measured with an atomic force microscope at the Jet Propulsion Laboratory, Pasadena, Calif. The surface measurement showed that the grating was quite sinusoidal with a peak to valley height of 0.185 micron. The grating period was 1.0 micron.

The Wood's anomaly for this grating should be quite evident. The angular location can be estimated where one expects to see strong absorption by calculating which plane wave angle is coupled into the plane wave traveling parallel to the surface by the grating. The Floquet condition, $\sin\theta_r = \sin\theta_i + i\lambda/d$, was used, where $\theta_r$ is the reflected angle, $\theta_i$ is the incident angle, and i is an integer. TABLE 3 below demonstrates that, by setting the reflected angle to $\sin\theta_r=1$, anomalous absorption is expected at the incident angles,

TABLE 3

| i | $\sin\theta_i = 1 - i\lambda/d$ |
|---|---|
| +1 | 0.367 |
| +2 | −0.266 | for this aluminum grating with $\lambda=0.6328\,\mu m$. Consequently, notches in the reflection are expected to be measured at these angles.

Figure 17:
FIG. 17 is a CCD image of the reflected Fourier plane for an aluminum grating with TM incidence, showing the Wood's anomalies.

FIG. 17 shows the CCD image of the reflected Fourier plane for an aluminum grating with TM incidence, clearly showing the Wood's anomalies. This image contains several interesting features. First, the numerical aperture for the incident spot was about 0.6, which is equal to the maximum $\sin(\theta)$ of the incident plane waves. In addition, the +1 and −1 diffracted orders are shifted $\sin(\theta)=\lambda/d =0.6328/1.0=0.6328$, thus forming the two partial circles that do not quite meet in the center. The faint complete circle that fills in the background is the zero order reflected spot. Small bands at the top and bottom of the zero order spot are diffracted light that was captured because the numerical aperture for the collection of the reflected light was about 0.7. This numerical aperture is larger than the numerical aperture for the incident light. Finally, the two dark arcs within each diffracted order result from the absorption of the Wood's anomalies. The darker band is for the +1 angle in the Table 3, and the other is for the +2 angle.

The numerical simulation for this problem was calculated for a sinusoidal surface in a medium with index of refraction 1.5+j7.3. The optical field is only about 2.7% of the incident amplitude at a depth of 500 Angstroms, because the imaginary part of the index of refraction is so large. Therefore, it is reasonable to approximate the thin film of aluminum by filling the whole volume with aluminum.

Figure 18:
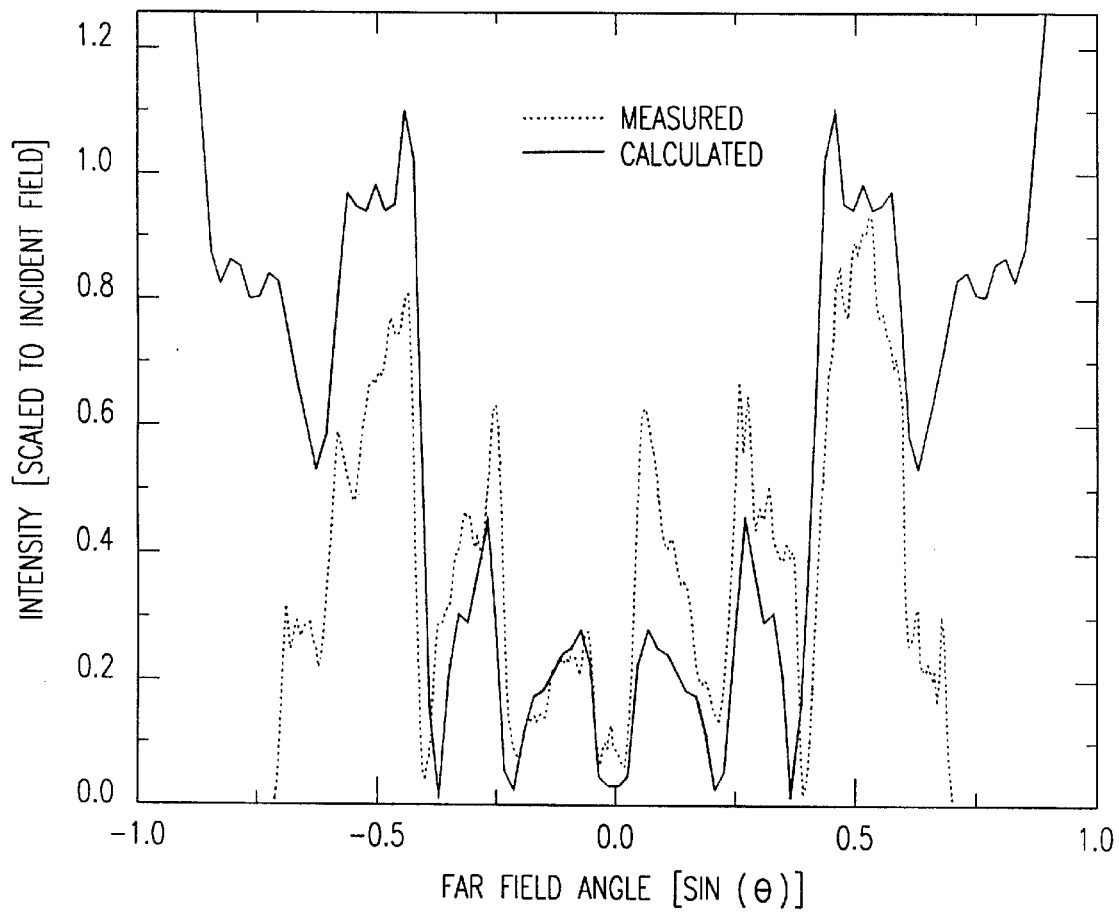
FIG. 18 shows plots of the measured far field and the far field calculated by the numerical integration method for a sinusoidal aluminum grating, with the Wood's anomalies evident as a null in the reflected field.

FIG. 18 compares the numerical, calculated result to a vertical cross-sectional measurement taken from the image for the aluminum grating. There is good agreement between the calculated results and the measured results at the smaller angles. The nulls in the reflected far field power due to the Wood's anomalies are quite evident and occur very close to the predicted angles. The small difference in the null angle between the numerical result and the measured cross section may be the result of a difference in the actual numerical aperture and the one used in the numerical calculation. This is because the horizontal scale of the measured data was scaled to the calculated data, assuming the numerical aperture used for each was identical. The vertical scale for each plot was derived by matching the measured and calculated reflection for a planar aluminum interface.

2. Single Groove in Gallium Arsenide

Figure 19A:
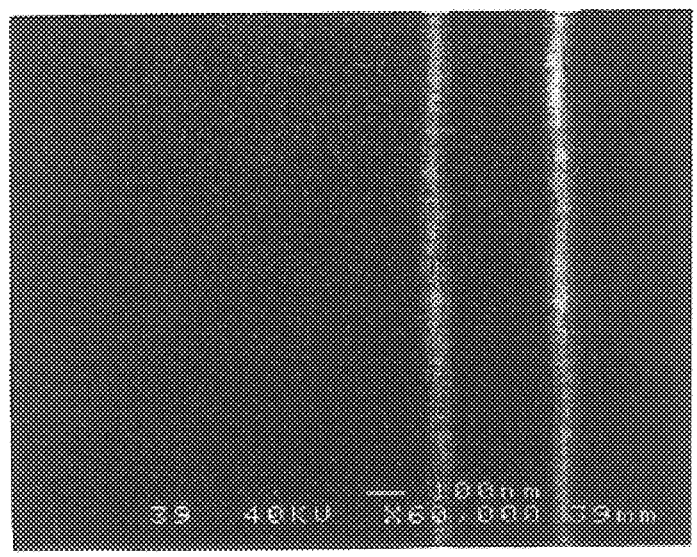
FIGS. 19A and 19B are scanning electron microscope photographs of a groove etched in Gallium-Arsenide and used in a diffraction measurement, where
Figure 19B:

Experimental verification was also performed for a set of grooves etched into gallium-arsenide. FIGS. 19A and 19B are photographs of one of the etched grooves and were taken by a scanning electron microscope. FIG. 19A is a top view of the groove and shows the groove width, which is about 0.35 micron. FIG. 19B shows a side view of the groove. The side view of FIG. 19B was obtained by forming a mask across the grooves and then etching the substrate away, thereby opening the groove to the side. The photograph of FIG. 19B was taken at a 60° angle. Direct measurement of the groove's depth from the photograph of FIG. 19B is difficult. The groove height was measured by comparing the groove to the large etch height, which could be measured with a surface profiler. The groove depth was measured to be about 0.65 micron.

Figure 20:
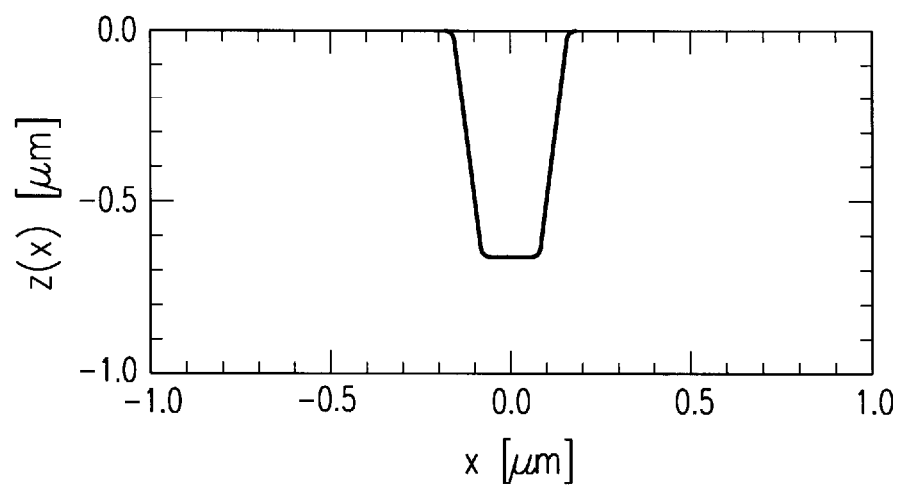
FIG. 20 is a plot of a contour used to represent the groove shown in FIGS. 19A and 19B.

FIG. 20 is a graphical representation of a surface contour that was used to estimate the shape of the gallium-arsenide groove. The contour of FIG. 20 was constructed from a raised cosine pulse.

Figure 21:
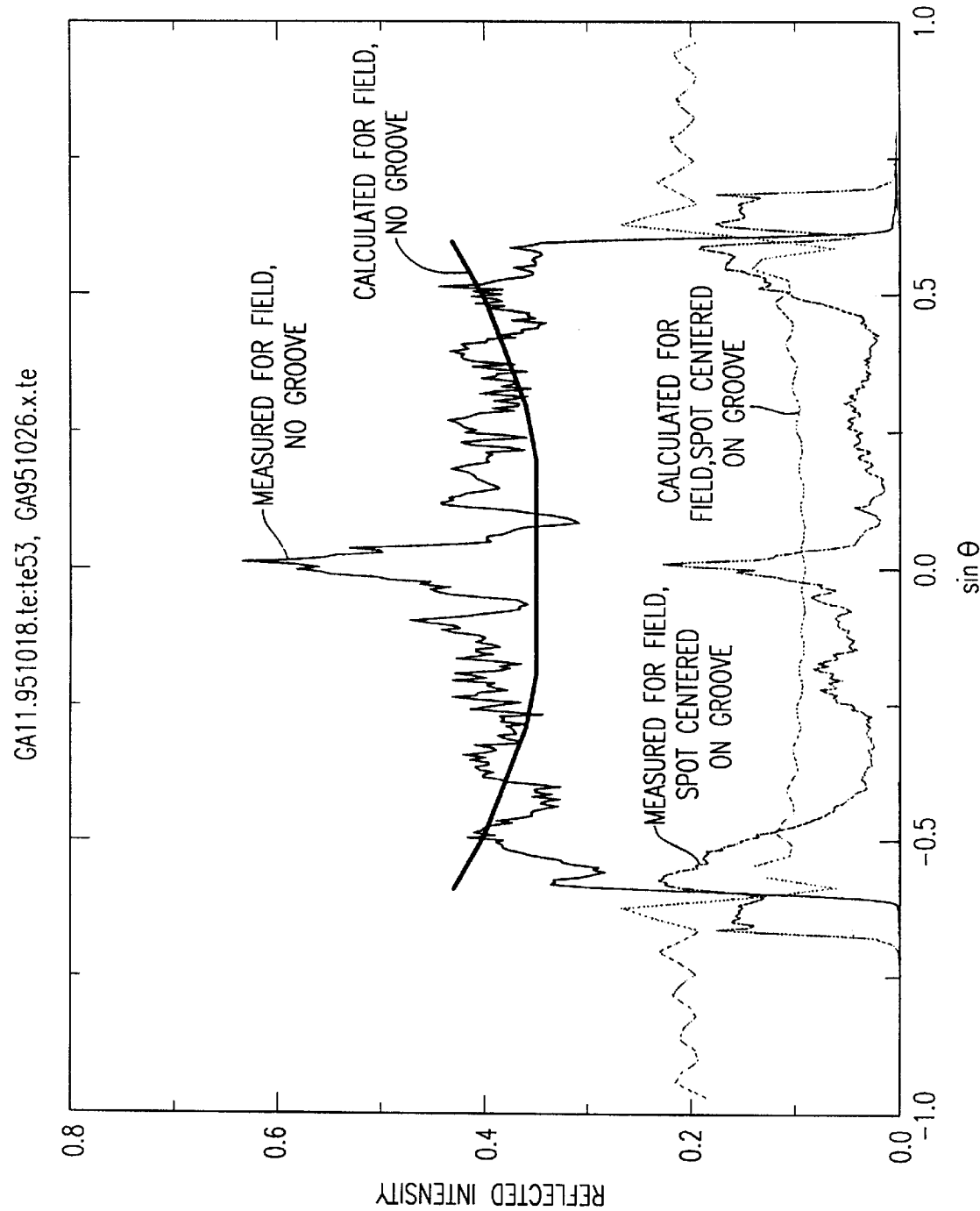
FIG. 21 shows plots of the measured far field and calculated far field for the groove of FIGS. 19A and 19B for the illuminating light centered on the groove and for the illuminating light away from the groove.

The measurement of the diffracted far field was performed by sliding the groove underneath the illuminating spot. The intensity profile at the CCD 1628 was recorded at each step of 0.1 micron. FIG. 21 compares the measured and calculated far fields for the illuminating spot centered on the groove and for the illuminating spot away from the groove. The overall change in intensity level between on and off the groove seems to agree between the calculated and measured data. The peak in the measured intensity in the middle of the far field is an artifact of light reflected from a lens surface that comes to a focus in the CCD plane; these peaks can be ignored. The reflected field calculated for the absence of a groove is simply the Fresnel reflection coefficients, and this reflection increases with far field angle for TE illumination.

Figure 22A:
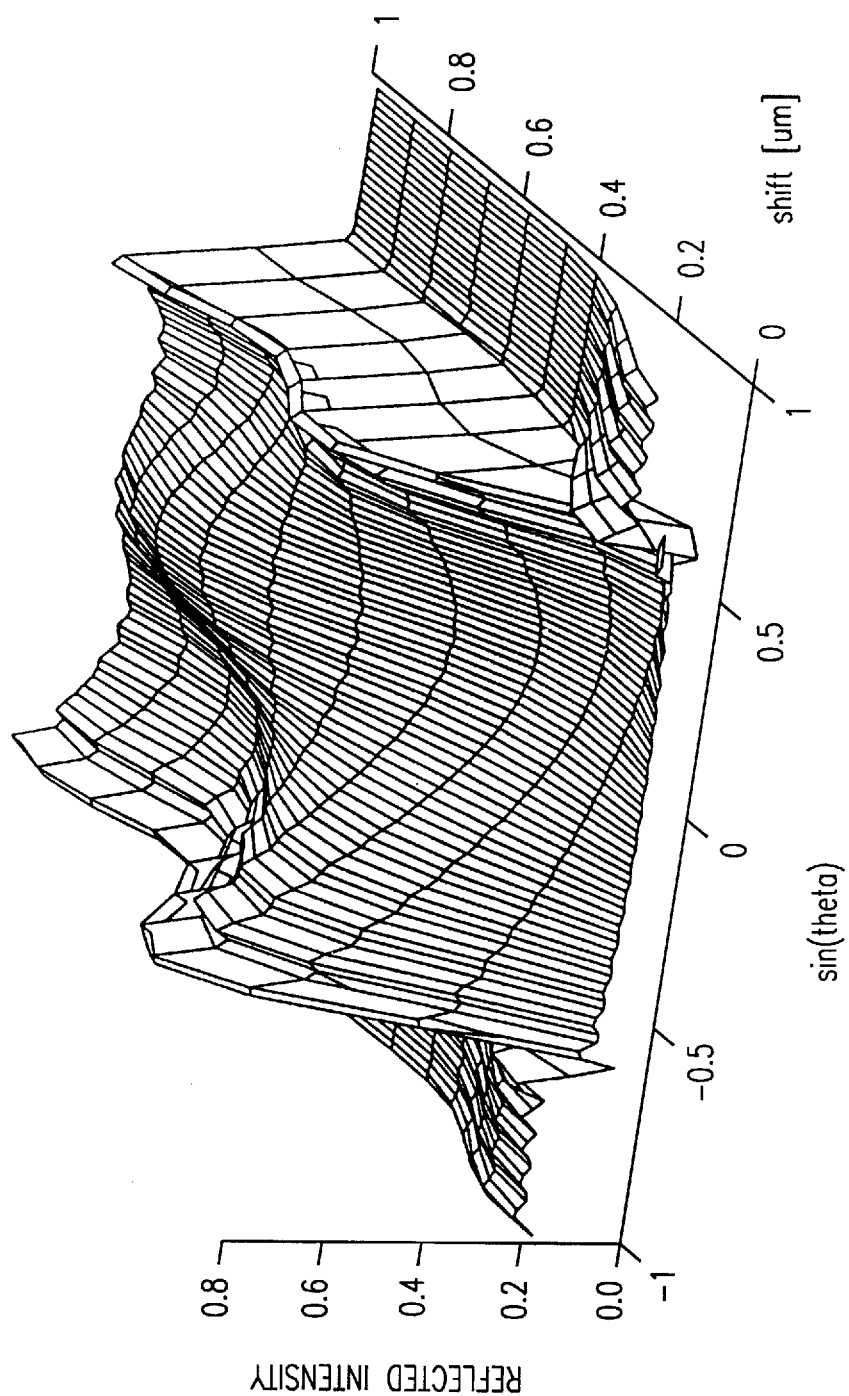
FIG. 22A and 22B show three-dimensional far field intensity profiles as the incident light source is shifted away from the groove of FIGS. 19A and 19B, where
Figure 22B:
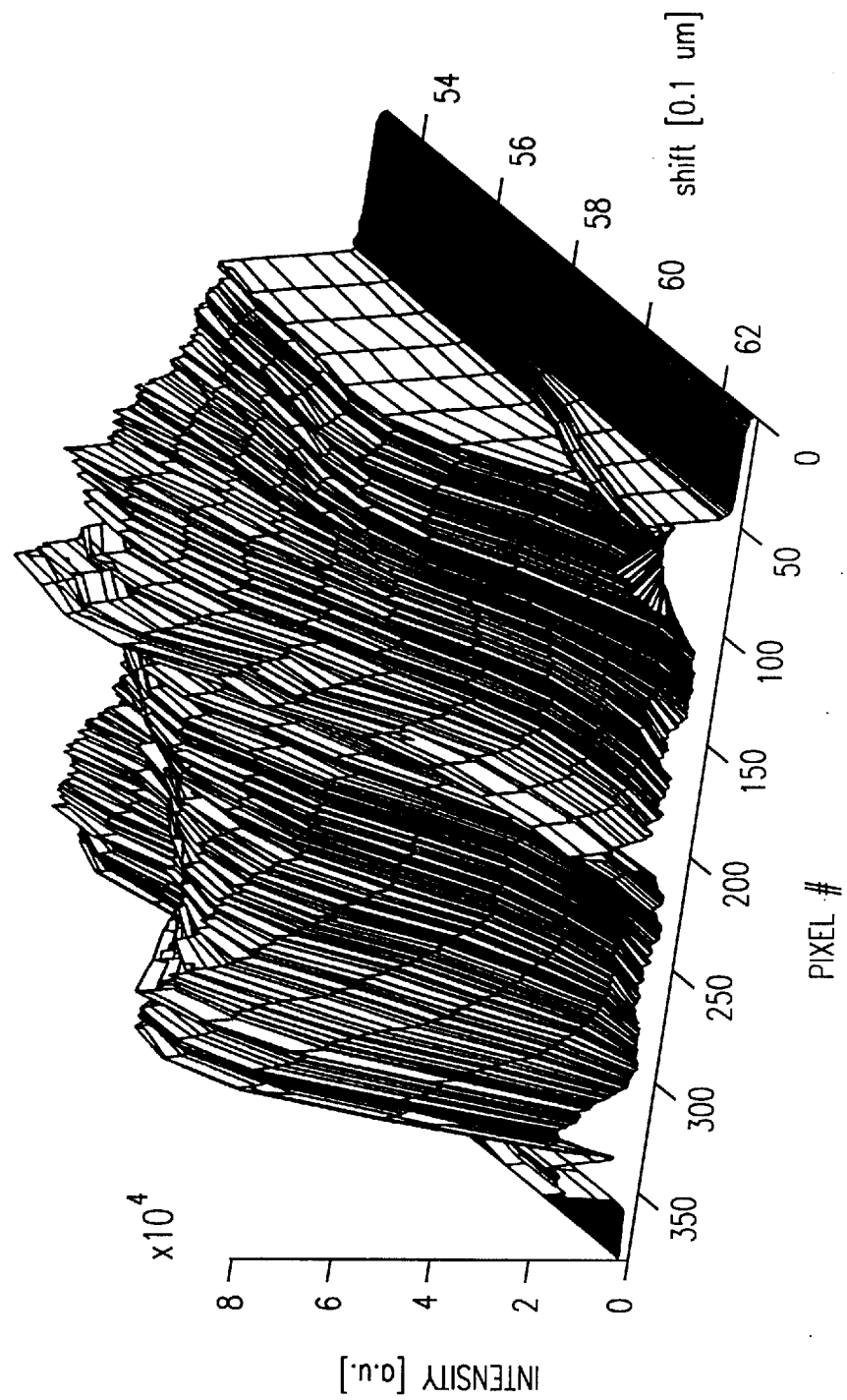

FIGS. 22A and 22B are graphical representations comparing the measurement with the complete calculation for the groove shifting underneath the illuminating spot. The graph of FIG. 22A is calculated using the numerical integration method, while the graph of FIG. 22B is the measured data. As before, the peak running down the middle of the measured data of FIG. 22B can be ignored. Features in common with the calculated and measured data are the waves on the left side of the plots. One difference between the two plots is that the slope on the front left part is steeper for the measured data than for calculated data.

IV. Reference Structure Method for Determining the Amplitude and Phase of the Diffracted Far Fields The numerical integration method described in section III is only one way to determine the amplitude and phase of the diffracted far field. Another method uses a sample having a set of reference structures, for which the structural parameters are already precisely known. This method will be referred to as the reference structure method.

The structural parameters of the reference structures are first measured using any known method. For example, a scanning electron microscope or atomic force microscope can be used to measure the reference structures.

The reference structures are then measured in accordance with the present invention, i.e., by the PQM technique explained in this description. Thus, the electromagnetic far field polarization responses for the reference structures are determined using PQM. The results of the PQM measurement for the structural parameters of the reference structures are then compared to the measurements taken for those parameters. The PQM method is thus calibrated, so as to account for differences between the measured and PQM results.

Next, a structure of unknown parameters is measured by the PQM method. The PQM results are then adjusted using the calibration factor derived from the differences between the measured and PQM results for the reference structures. An accurate measurement of unknown structures can thus be obtained without using the numerical integration method described above.

Although only a few embodiments have been described in detail above, those having ordinary skill in the art will readily realize that many modifications are possible without departing from the advantageous teaching therein. For example, several methods for testing the results of the numerical integration method have been described. It should be understood by those having ordinary skill in the art, however, that other methods could be used to test the results. Moreover, several embodiments of the apparatus for carrying out the PQM technique have been described. Those skilled in the art should understand, however, that other embodiments of this apparatus also exist. A hardware embodiment has been described above for carrying out various functions. Many advantages of the present invention are obtained from the hardware operation. However it should be understood by those having ordinary skill in the art that certain of these advantages and functions can also be carried out in software. For example, a special purpose digital signal processor could be appropriately programmed with firmware to carry out the functions of this assembly. Other similar modifications would also be apparent to those having ordinary skill in the art, and are intended to be encompassed within the following claims.

What is claimed is:

1. A method for optically measuring structure, comprising the steps of:
   a. selecting at least one structure from among a plurality of structures on a substrate by focusing a beam of polarized incident light on the selected structure, the selected structure having a plurality of structural parameters, wherein the selecting step includes focusing the beam of incident light on a plurality of aperiodic asymmetric structures;
   b. diffracting the beam of incident light off the structure to form a diffracted light which is a single diverging beam of light, such that an amplitude and a phase of the single diverging beam of light depends on the polarization of the incident light beam;
   c. detecting the single diverging beam of light; and
   d. determining an amplitude of and a phase difference between at least two polarization components of the single diverging beam of light to measure at least one unknown structural parameter of the structure.

2. A method for optically measuring structure, comprising the steps of:
   a. selecting at least one structure from among a plurality of structures on a substrate by focusing a beam of polarized incident light on the selected structure, the selected structure having a plurality of structural parameters, wherein the selecting step includes focusing the beam of incident light on a single asymmetric structure;
   b. diffracting the beam of incident light off the structure to form a diffracted light which is a single diverging beam of light, such that an amplitude and a phase of the single diverging beam of light depends on the polarization of the incident light beam;
   c. detecting the single diverging beam of light; and
   d. determining an amplitude of and a phase difference between at least two polarization components of the single diverging beam of light to measure at least one unknown structural parameter of the structure.

3. A method for optically measuring structure, comprising the steps of:
   a. selecting at least one structure from among a plurality of structures on a substrate by focusing a beam of polarized incident light on the selected structure, the selected structure having a plurality of structural parameters;
   b. diffracting the beam of incident light off the structure to form a diffracted light which is a single diverging beam of light, such that an amplitude and a phase of the single diverging beam of light depends on the polarization of the incident light beam;
   c. detecting the single diverging beam of light; and
   d. determining an amplitude of and a phase difference between at least two polarization components of the single diverging beam of light to measure at least one unknown structural parameter of the structure,
   wherein the structure has a surface contour, and the measuring step, for each polarization component, includes:
      a. dividing the structure into a plurality of grid points, each grid point being located on the surface contour;
      b. calculating, at each grid point, an incident field vector resulting from the beam of incident light;
      c. creating a matrix from the incident field vectors;
      d. calculating electric and magnetic fields along the surface contour using the matrix; and
      e. calculating the amplitude and phase of the diffracted polarization component using the calculated electric and magnetic fields along the surface contour.

4. A method for optically measuring structure, comprising the steps of:
   a. selecting at least one structure from among a plurality of structures on a substrate by focusing a beam of polarized incident light on the selected structure, the selected structure having a plurality of structural parameters;
   b. diffracting the beam of incident light off the structure to form a diffracted light which is a single diverging beam of light, such that an amplitude and a phase of the single diverging beam of light depends on the polarization of the incident light beam;
   c. detecting the single diverging beam of light; and
   d. determining an amplitude of and a phase difference between at least two polarization components of the single diverging beam of light to measure at least one unknown structural parameter of the structure,
   wherein the structure is a three-dimensional structure in a microelectronic circuit.

5. A method for optically measuring structure, comprising the steps of:
   a. selecting at least one structure from among a plurality of structures on a substrate by focusing a beam of polarized incident light on the selected structure, the selected structure having a plurality of structural parameters;
   b. diffracting the beam of incident light off the structure to form a diffracted light which is a single diverging beam of light, such that an amplitude and a phase of the single diverging beam of light depends on the polarization of the incident light beam;
   c. detecting the single diverging beam of light; and
   d. determining an amplitude of and a phase difference between at least two polarization components of the single diverging beam of light to measure at least one unknown structural parameter of the structure; wherein at least one of the structural parameters is substantially greater than the wavelength of the incident light.

6. A system for optically measuring a structure having a plurality of structural parameters, comprising:
   a. a source for selecting at least one structure from among a plurality of structures on a substrate by focusing a beam of incident light on the selected structure, such that the beam of incident light is diffracted by the selected structure, to form a diffracted beam which is a single diverging beam of light;
   b. a detector for detecting the single diverging beam of light; and
   c. means for determining an amplitude of and a phase difference between at least two polarization components of the single diverging beam of light to measure at least one unknown structural parameter of the structure, wherein the beam of incident light is focused on a plurality of aperiodic asymmetric structures.

7. A system for optically measuring a structure having a plurality of structural parameters, comprising:

a. a source for selecting at least one structure from among a plurality of structures on a substrate by focusing a beam of incident light on the selected structure, such that the beam of incident light is diffracted by the selected structure, to form a diffracted beam which is a single diverging beam of light;

b. a detector for detecting the single diverging beam of light; and c. means for determining an amplitude of and a phase difference between at least two polarization components of the single diverging beam of light to measure at least one unknown structural parameter of the structure, wherein the beam of incident light is focused on a single asymmetric structure.

8. A system for optically measuring a structure having a plurality of structural parameters, comprising:

a. a source for selecting at least one structure from among a plurality of structures on a substrate by focusing a beam of incident light on the selected structure, such that the beam of incident light is diffracted by the selected structure, to form a diffracted beam which is a single diverging beam of light;

b. a detector for detecting the single diverging beam of light; and c. means for determining an amplitude of and a phase difference between at least two polarization components of the single diverging beam of light to measure at least one unknown structural parameter of the structure, wherein the structure has a surface contour and the means for determining the amplitude and phase include, for each polarization component, means for:
  a. dividing the structure into a plurality of grid points, each grid point being located on the surface contour;
  b. calculating, at each grid point, an incident field vector resulting from the beam of incident light;
  c. creating a matrix from the incident field vectors;
  d. calculating electric and magnetic fields along the surface contour using the matrix; and
  e. calculating the amplitude and phase of the diffracted polarization component using the calculated electric and magnetic fields along the surface contour.

9. A system for optically measuring a structure having a plurality of structural parameters, comprising:

a. a source for selecting at least one structure from among a plurality of structures on a substrate by focusing a beam of incident light on the selected structure, such that the beam of incident light is diffracted by the selected structure, to form a diffracted beam which is a single diverging beam of light;

b. a detector for detecting the single diverging beam of light; and c. means for determining an amplitude of and a phase difference between at least two polarization components of the single diverging beam of light to measure at least one unknown structural parameter of the structure, wherein the structure is a three-dimensional structure in a microelectronic circuit.

10. A system for optically measuring a structure having a plurality of structural parameters and a surface contour, the system comprising:

a. means for selecting at least one structure from among a plurality of structures on a substrate by focusing a polarized light beam on the selected structure, such that the polarized light beam is diffracted by the selected structure to form a diffracted light which is a single diverging beam of light, the polarized light beam having a wavelength;

b. means for detecting the single diverging beam of light;

c. means for determining an amplitude and a phase of at least two polarization components of the single diverging beam of light; and d. means for comparing the amplitude and phase of the polarization components to one another to measure at least one structural parameter of the selected structure, including, for each polarization component, means for:
  (1) dividing the selected structure into a plurality of grid points, each grid point being located on the surface contour of the selected structure,
  (2) calculating, at each grid point, an incident field vector resulting from the light beam,
  (3) creating a matrix from the incident field vectors,
  (4) calculating electric and magnetic fields along the surface contour using the matrix, and
  (5) calculating the amplitude and phase of the diffracted polarization component using the calculated electric and magnetic fields along the surface contour.

* * * * *